United States Patent
Yang et al.

(10) Patent No.: US 10,673,579 B2
(45) Date of Patent: Jun. 2, 2020

(54) METHOD AND APPARATUS FOR TRANSRECEIVING WIRELESS SIGNAL IN WIRELESS COMMUNICATION SYSTEM BASED ON DOWNLINK SCHEDULING INFORMATION INCLUDING DIFFERENT TIME UNIT TYPES

(71) Applicant: LG ELECTRONICS INC., Seoul (KR)

(72) Inventors: Suckchel Yang, Seoul (KR); Kijun Kim, Seoul (KR); Byounghoon Kim, Seoul (KR); Eunsun Kim, Seoul (KR); Hanjun Park, Seoul (KR); Ilmu Byun, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/080,594

(22) PCT Filed: Mar. 3, 2017

(86) PCT No.: PCT/KR2017/002338
§ 371 (c)(1),
(2) Date: Aug. 28, 2018

(87) PCT Pub. No.: WO2017/150944
PCT Pub. Date: Sep. 8, 2017

(65) Prior Publication Data
US 2019/0081744 A1 Mar. 14, 2019

Related U.S. Application Data

(60) Provisional application No. 62/303,308, filed on Mar. 3, 2016, provisional application No. 62/309,968, filed
(Continued)

(51) Int. Cl.
*H04L 1/18* (2006.01)
*H04L 5/14* (2006.01)
(Continued)

(52) U.S. Cl.
CPC .......... *H04L 1/1887* (2013.01); *H04L 1/1854* (2013.01); *H04L 5/0055* (2013.01);
(Continued)

(58) Field of Classification Search
CPC . H04L 1/1854; H04L 1/1887; H04L 27/2602; H04L 27/2607; H04L 5/00;
(Continued)

(56) References Cited

U.S. PATENT DOCUMENTS 9,820,237 B2* 11/2017 Yang ................ H04W 52/58
10,404,420 B2* 9/2019 Ji ...................... H04W 72/0406
(Continued)

OTHER PUBLICATIONS

Lähetkangas et al., "On the TDD Subframe Structure for Beyond 4G Radio Access Network," Future Network and Mobile Summit, Jul. 3-5, 2013, pp. 1-10 (12 pages total).

*Primary Examiner* — Dung B Huynh
(74) *Attorney, Agent, or Firm* — Birch, Stewart, Kolasch & Birch, LLP

(57) ABSTRACT

The present invention relates to a wireless communication system, and particularly, to a method and an apparatus for same, the method comprising the steps of: receiving DL data from a DL data zone of time unit # n; transmitting ACK/NACK information for the DL data from a UL control zone of time unit # n+1; and receiving DL scheduling information indicating retransmission of the DL data from a DL control zone of time unit # n+2, wherein each of the time units comprises, in time order, the DL control zone, a GP, the UL control zone, and the DL data zone.

10 Claims, 18 Drawing Sheets

Related U.S. Application Data on Mar. 18, 2016, provisional application No. 62/313,084, filed on Mar. 24, 2016, provisional application No. 62/332,475, filed on May 6, 2016, provisional application No. 62/443,627, filed on Jan. 6, 2017.

(51) Int. Cl.
*H04L 5/00* (2006.01)
*H04L 27/26* (2006.01)
*H04W 72/04* (2009.01)
*H04W 72/12* (2009.01)

(52) U.S. Cl.
CPC .......... *H04L 5/0082* (2013.01); *H04L 5/0094* (2013.01); *H04L 5/1469* (2013.01); *H04L 27/2607* (2013.01); *H04W 72/0413* (2013.01); *H04W 72/1205* (2013.01); *H04L 5/001* (2013.01); *H04L 5/0023* (2013.01); *H04L 27/2602* (2013.01)

(58) Field of Classification Search
CPC ..... H04L 5/0055; H04L 5/001; H04L 5/0023; H04L 5/0082; H04L 5/0094; H04L 5/1469; H04W 72/0413; H04W 72/1205
See application file for complete search history.

(56) References Cited

U.S. PATENT DOCUMENTS

| | | | |
|---|---|---|---|
| 2005/0208945 A1* | 9/2005 | Hong | H04W 36/0055 455/436 |
| 2009/0175232 A1* | 7/2009 | Kolding | H04L 1/0027 370/329 |
| 2009/0180435 A1 | 7/2009 | Sarkar | |
| 2009/0213766 A1* | 8/2009 | Chindapol | H04B 7/2621 370/278 |
| 2010/0027495 A1* | 2/2010 | Che | H04L 1/1854 370/329 |
| 2011/0058504 A1* | 3/2011 | Jo | H04W 72/1263 370/280 |
| 2011/0070821 A1* | 3/2011 | Chun | H04B 7/155 455/7 |
| 2011/0085478 A1* | 4/2011 | Zhongfeng | H04B 7/155 370/280 |
| 2011/0103315 A1* | 5/2011 | Camp, Jr. | H04L 1/1854 370/329 |
| 2011/0211503 A1* | 9/2011 | Che | H04L 5/0005 370/280 |
| 2011/0211522 A1* | 9/2011 | Chung | H04L 1/1822 370/315 |
| 2011/0235602 A1* | 9/2011 | Ji | H04L 5/0007 370/329 |
| 2012/0039284 A1* | 2/2012 | Barbieri | H04W 48/10 370/329 |
| 2012/0076089 A1* | 3/2012 | Kawamura | H04L 1/0031 370/329 |
| 2012/0093061 A1* | 4/2012 | Charbit | H04B 7/15557 370/315 |
| 2012/0113827 A1* | 5/2012 | Yamada | H04L 1/0031 370/252 |
| 2012/0176887 A1* | 7/2012 | Mcbeath | H04L 1/1822 370/216 |
| 2012/0230272 A1* | 9/2012 | Kim | H04L 1/1861 370/329 |
| 2012/0257554 A1* | 10/2012 | Kim | H04L 5/001 370/280 |
| 2012/0307689 A1* | 12/2012 | Kim | H04L 1/1861 370/280 |
| 2012/0307758 A1* | 12/2012 | Moon | H04L 1/1854 370/329 |
| 2013/0016686 A1* | 1/2013 | Li | H04L 1/1822 370/329 |
| 2013/0039193 A1* | 2/2013 | Yin | H04W 72/0486 370/252 |
| 2013/0308503 A1* | 11/2013 | Kim | H04L 5/0053 370/280 |
| 2014/0036889 A1* | 2/2014 | Kim | H04L 1/1854 370/336 |
| 2014/0044092 A1* | 2/2014 | Guan | H04W 72/0413 370/330 |
| 2014/0112277 A1 | 4/2014 | Yang et al. | |
| 2014/0146738 A1* | 5/2014 | Morioka | H04L 1/1861 370/312 |
| 2014/0161084 A1* | 6/2014 | Yang | H04L 1/1822 370/329 |
| 2014/0204892 A1* | 7/2014 | Oizumi | H04L 1/00 370/329 |
| 2014/0321382 A1* | 10/2014 | Guan | H04W 72/1289 370/329 |
| 2015/0098418 A1* | 4/2015 | Vajapeyam | H04L 1/189 370/329 |
| 2015/0103704 A1* | 4/2015 | Skov | H04W 72/0446 370/280 |
| 2015/0201431 A1* | 7/2015 | Um | H04L 5/0048 370/280 |
| 2015/0215825 A1* | 7/2015 | Kim | H04W 36/0088 370/331 |
| 2015/0249980 A1* | 9/2015 | You | H04L 1/1861 370/329 |
| 2016/0013902 A1* | 1/2016 | Cui | H04W 72/04 370/329 |
| 2016/0020891 A1 | 1/2016 | Jung et al. | |
| 2016/0028526 A1 | 1/2016 | Seo et al. | |
| 2016/0112892 A1* | 4/2016 | Damnjanovic | H04W 24/10 370/336 |
| 2016/0135143 A1* | 5/2016 | Won | H04W 72/005 370/312 |
| 2016/0249329 A1* | 8/2016 | Au | H04W 48/00 |
| 2016/0255649 A1* | 9/2016 | Kusashima | H04W 28/06 370/280 |
| 2016/0261453 A1* | 9/2016 | Um | H04L 27/2692 |
| 2016/0360510 A1* | 12/2016 | Lee | H04L 5/1469 |
| 2017/0041119 A1* | 2/2017 | Ang | H04L 5/1469 |
| 2017/0063514 A1* | 3/2017 | Chen | H04L 5/14 |
| 2017/0141903 A1* | 5/2017 | Xu | H04L 1/0005 |
| 2017/0208574 A1* | 7/2017 | Ramakrishna | H04L 5/0055 |
| 2017/0208583 A1* | 7/2017 | Jiang | H04W 72/00 |
| 2017/0223702 A1* | 8/2017 | Yin | H04L 1/1812 |
| 2017/0272214 A1* | 9/2017 | Chen | H04L 5/1469 |
| 2018/0062796 A1* | 3/2018 | Feng | H04L 1/1812 |
| 2018/0062817 A1* | 3/2018 | Cheng | H04L 27/26 |
| 2018/0139733 A1* | 5/2018 | Ko | H04L 1/18 |
| 2018/0249374 A1* | 8/2018 | Park | H04J 11/00 |
| 2018/0337752 A1* | 11/2018 | Choi | H04B 7/26 |
| 2019/0013908 A1* | 1/2019 | Xiong | H04L 5/0055 |
| 2019/0068334 A1* | 2/2019 | Stern-Berkowitz | H04L 1/1822 |
| 2019/0074936 A1* | 3/2019 | Lee | H04L 1/18 |
| 2019/0245655 A1* | 8/2019 | Seo | H04L 1/16 |

* cited by examiner

HARQ processes in UL-DL configuration #1

PUSCH-PHICH/UL grant timing (UL-DL configuration #1)

HARQ processes in UL-DL configuration #1

METHOD AND APPARATUS FOR TRANSRECEIVING WIRELESS SIGNAL IN WIRELESS COMMUNICATION SYSTEM BASED ON DOWNLINK SCHEDULING INFORMATION INCLUDING DIFFERENT TIME UNIT TYPES

CROSS REFERENCE TO RELATED APPLICATIONS

This application is the National Phase of PCT International Application. No. PCT/KR2017/002338, filed on Mar. 3, 2017, which claims priority under 35 U.S.C. 119(e) to U.S. Provisional Application Nos. 62/303,308 filed on Mar. 3, 2016, 62/309,968 filed on Mar. 18, 2016, 62/313,084 filed on Mar. 24, 2016, 62/332,475 filed on May 6, 2016, and 62/443,627 filed on Jan. 6, 2017, all of which are hereby expressly incorporated by reference into the present application.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

It is an object of the present invention to provide a method and apparatus for efficiently performing operations of transmission and reception of a wireless signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink signal, which is transmitted by a user equipment in a wireless communication system, includes the steps of receiving a DL (downlink) data in a DL data duration of a time unit # n, transmitting ACK/NACK (acknowledgement/negative acknowledgement) information in a UL (uplink) control duration of a time unit # n+1 in response to the DL data, and receiving DL scheduling information indicating retransmission of the DL data in a DL control duration of a time unit # n+2. In this case, each of the time units can include a DL control duration, a GP (guard period), a UL control duration, and a DL data duration in time order.

To further achieve these and other advantages and in accordance with the purpose of the present invention, according to a different embodiment, a user equipment in a wireless communication system includes an RF (radio frequency) module, and a processor, the processor configured to receive a DL (downlink) data in a DL data duration of a time unit # n, the processor configured to transmit ACK/NACK (acknowledgement/negative acknowledgement) information in a UL (uplink) control duration of a time unit # n+1 in response to the DL data, the processor configured to receive DL scheduling information indicating retransmission of the DL data in a DL control duration of a time unit # n+2. In this case, each of the time units can include a DL control duration, a GP (guard period), a UL control duration, and a DL data duration in time order.

Preferably, the method can further include the step of receiving DL scheduling information indicating an initial transmission of the DL data in the DL control duration of the time unit # n.

Preferably, each of the time units can include a plurality of OFDMA (orthogonal frequency division multiple access) symbols.

Preferably, each of the time units may correspond to a subframe or a half-frame.

Preferably, each of the time units may correspond to a TTI (transmission time interval) or a half-TTI.

Preferably, the DL data is received via a PDSCH (physical downlink shared channel) and the ACK/NACK information can be transmitted via a PUCCH (physical uplink control channel).

Preferably, the wireless communication system can include 3GPP LTE ($3^{rd}$ generation project partnership long term evolution)-based wireless communication system.

Advantageous Effects

According to embodiments of the present invention, wireless signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
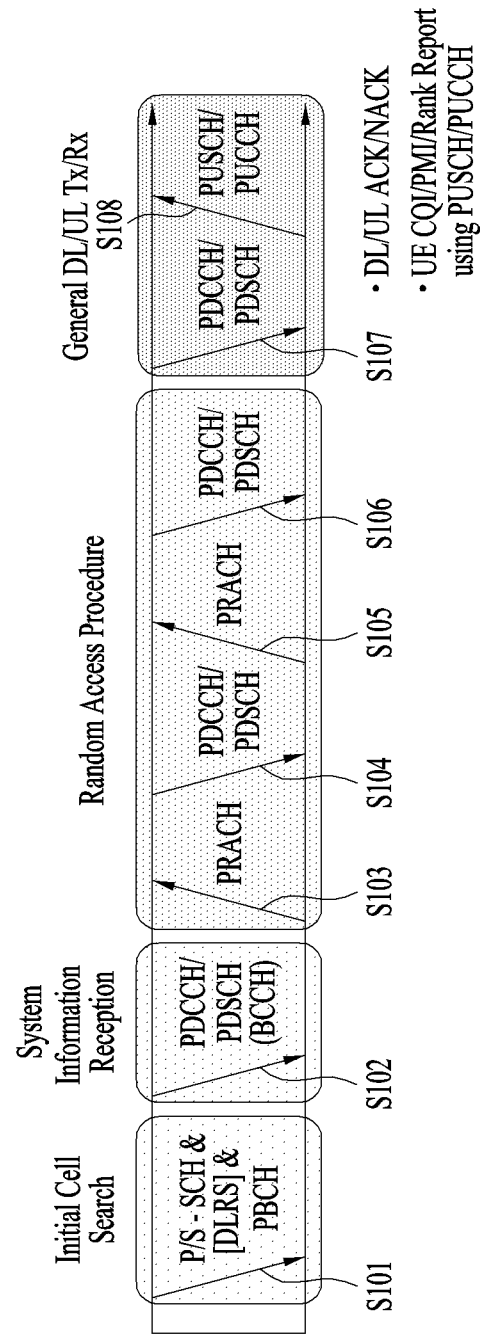
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
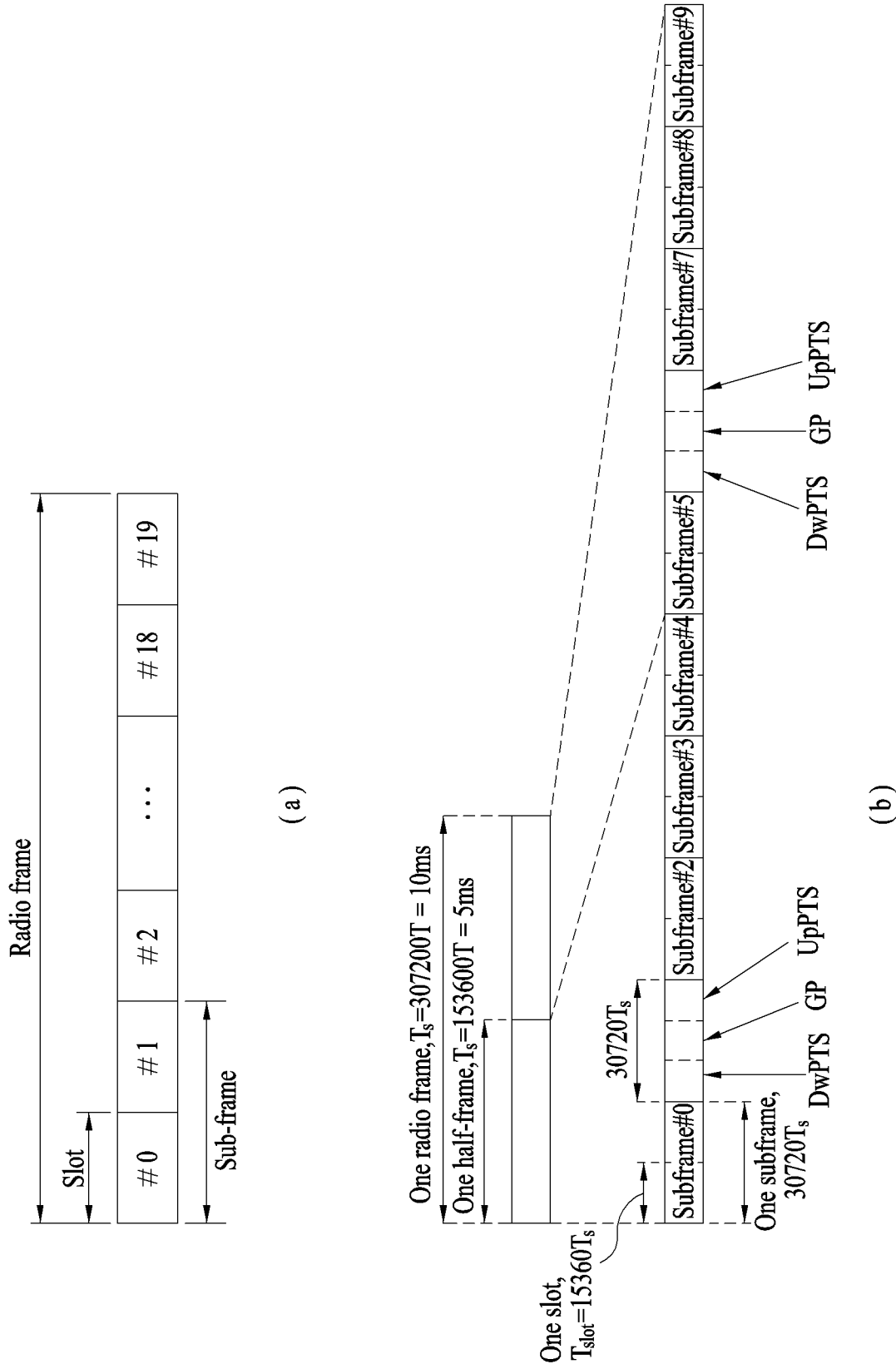
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
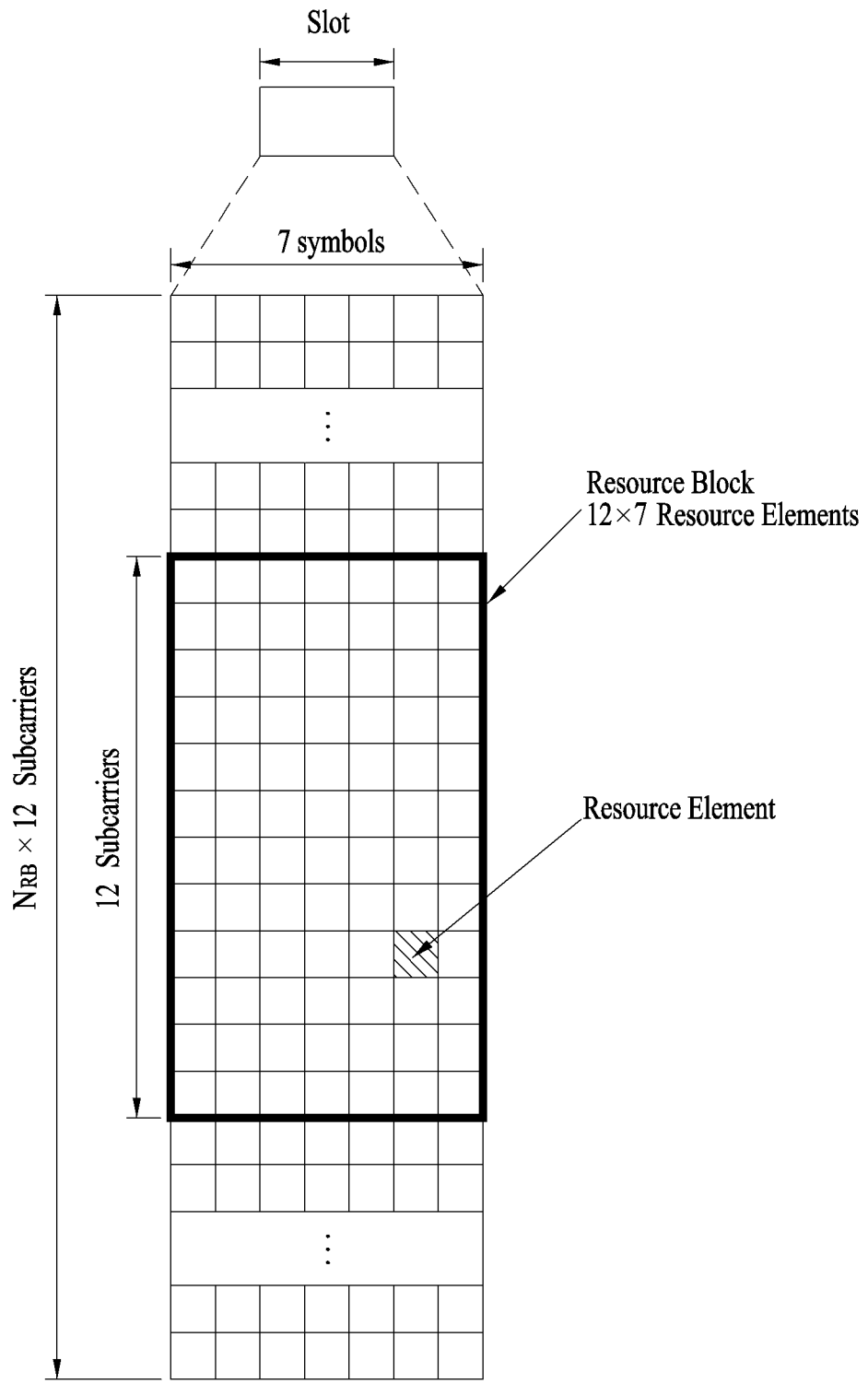
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
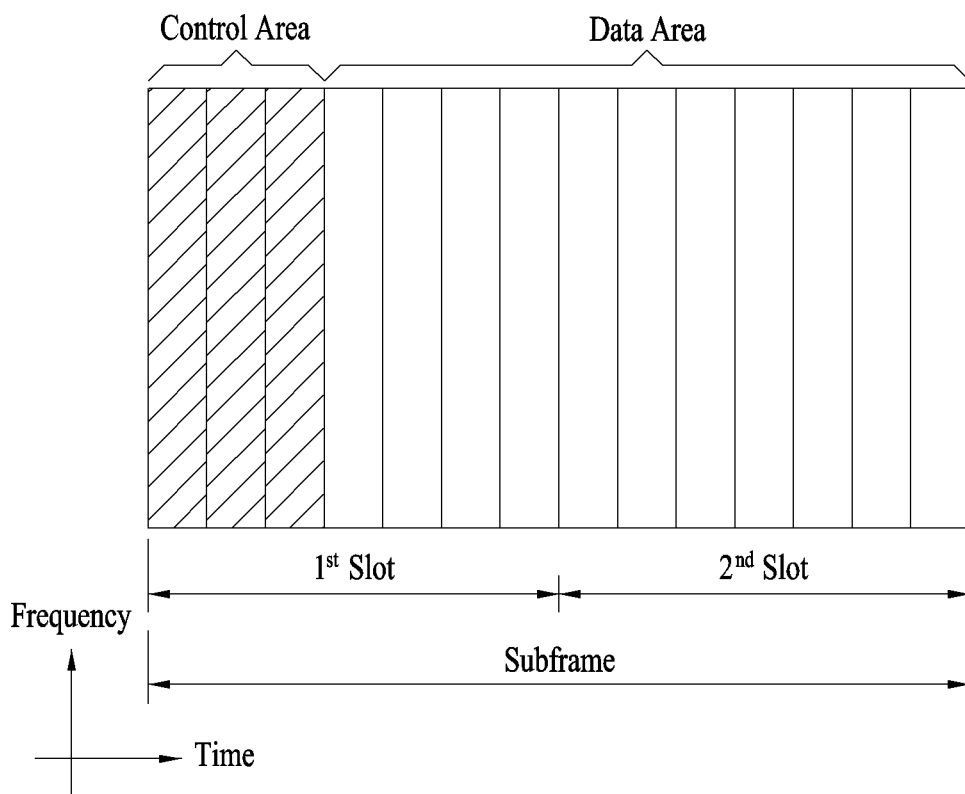
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG 4 QPSK symbols are mapped to one REG REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
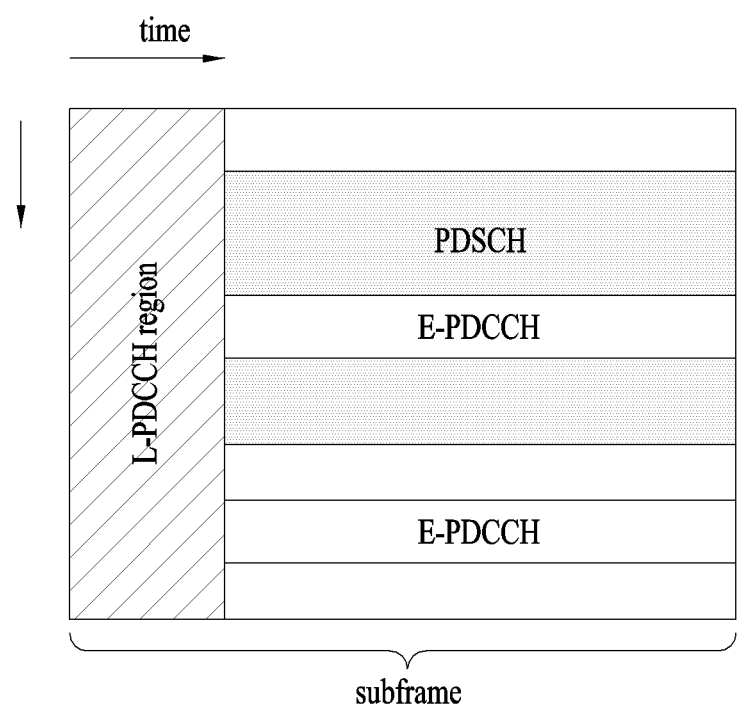
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

In this specification, the PDCCH includes both L-PDCCH and EPDCCH unless otherwise noted.

Figure 6:
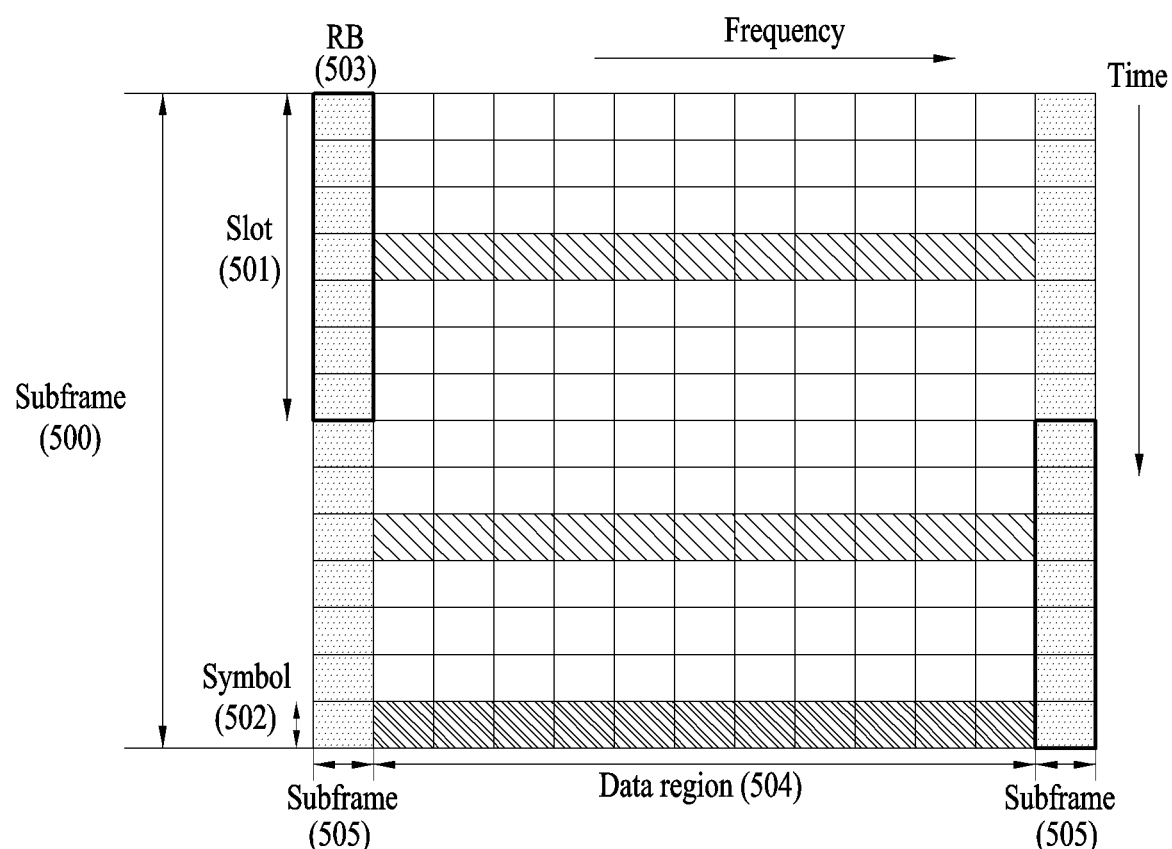
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 7:
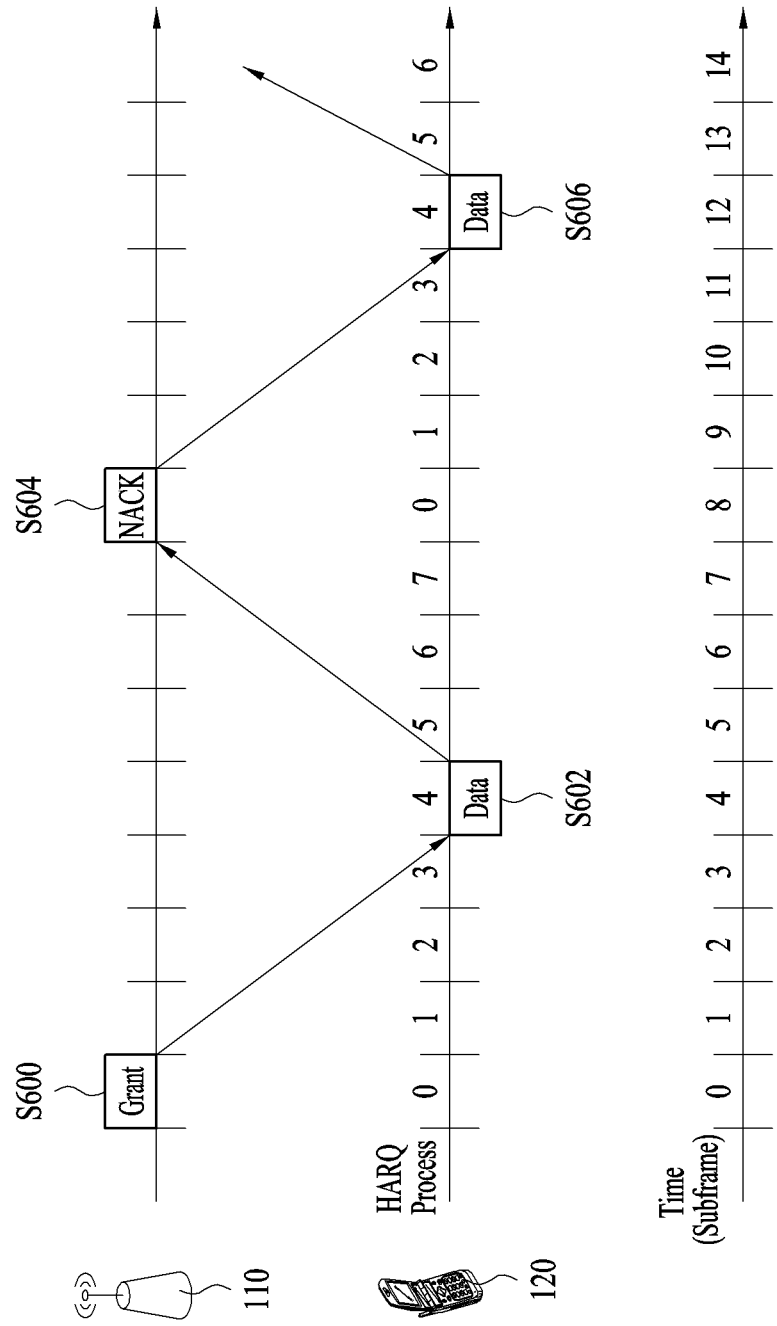
FIG. 7 illustrates UL HARQ (Uplink Hybrid Automatic Repeat reQuest) operation.

FIG. 7 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 7, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

A description will be given of TDD signal transmission timing in a single carrier (or cell) situation with reference to FIGS. 8 to 14.

Figure 8:
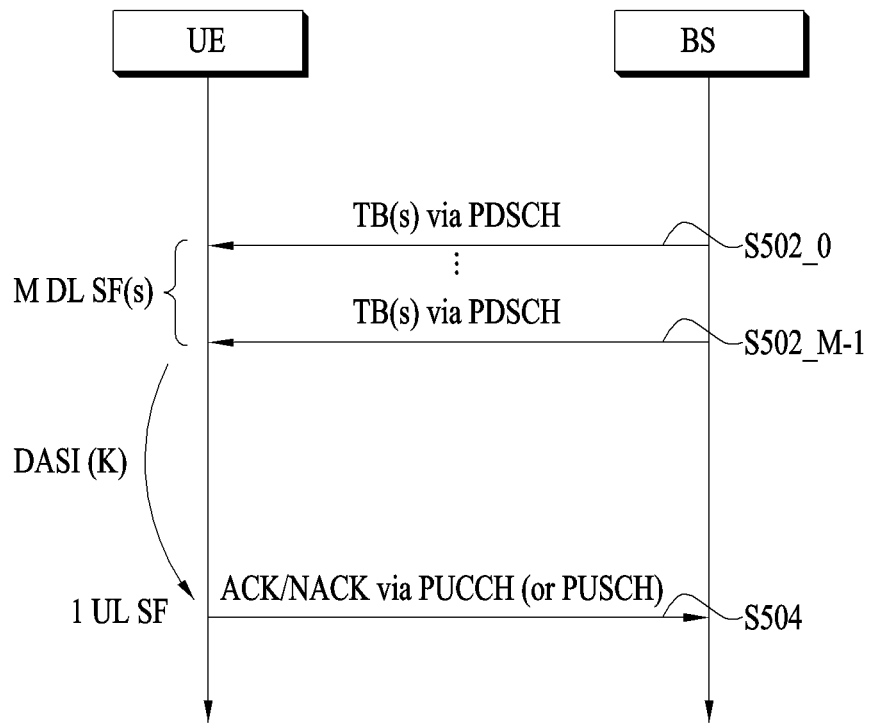
FIGS. 8 and 9 illustrate TDD UL ACK/NACK (Uplink Acknowledgement/Negative Acknowledgement) transmission timing in a single cell case.
Figure 9:
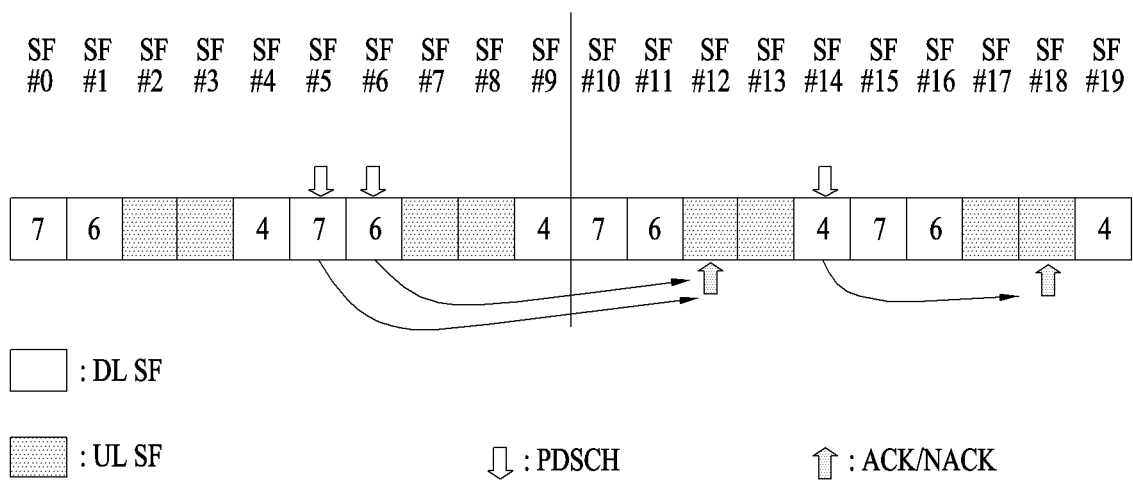

FIGS. 8 and 9 illustrate PDSCH-UL ACK/NACK timing. Here, UL ACK/NACK refers to ACK/NACK transmitted on uplink in response to DL data (e.g., PDSCH).

Referring to FIG. 8, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈EK), the UE transmits ACK/NACK in a subframe n.

TABLE 4

| TDD UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 9 illustrates UL ACK/NACK transmission timing when UL-DL configuration #1 is configured. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

Figure 10:
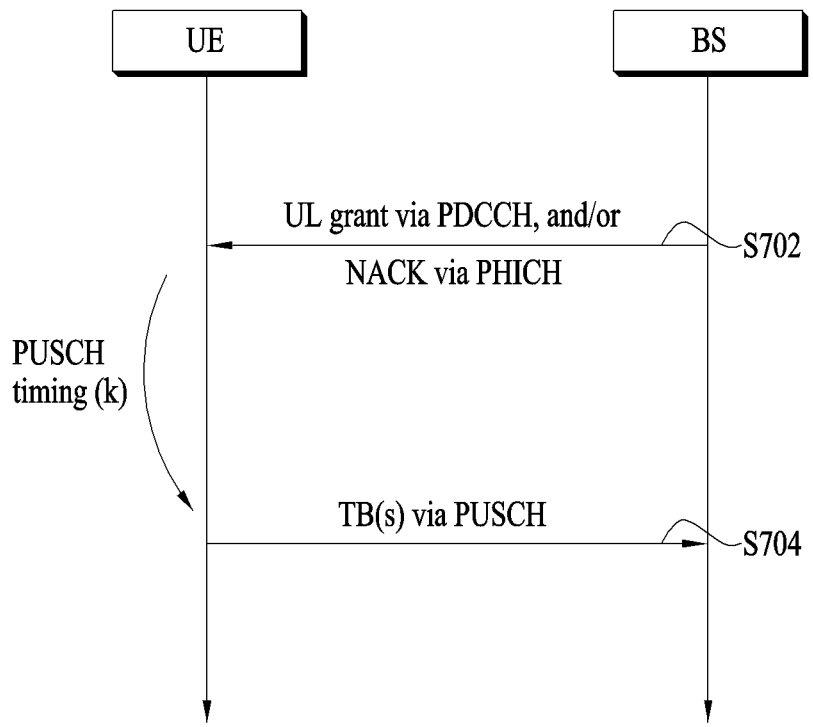
FIGS. 10 and 11 illustrate TDD PUSCH (Physical Uplink Shared Channel) transmission timing in a single cell case.
Figure 11:
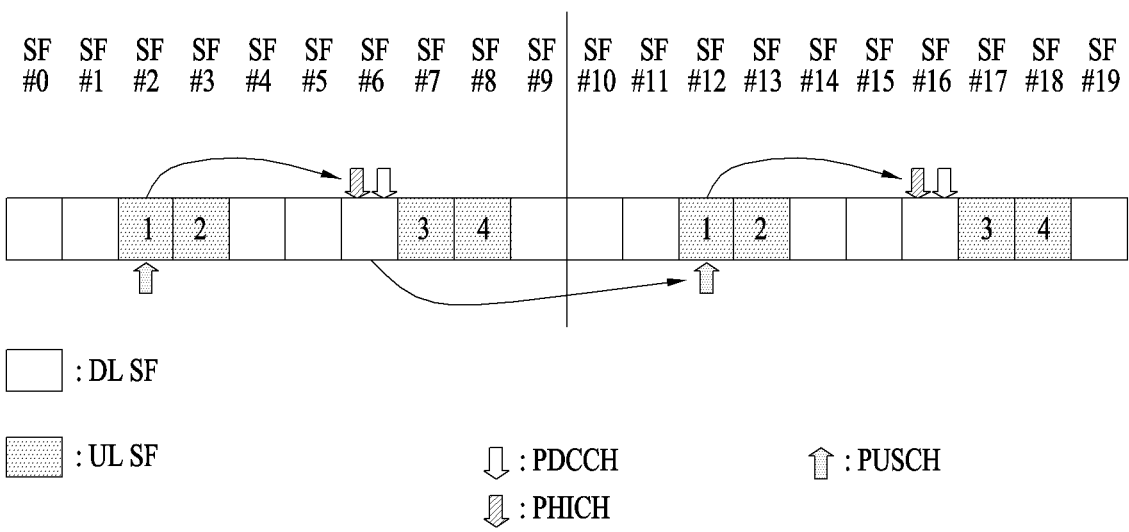

FIGS. 10 and 11 illustrate PHICH grant-PUSCH timing. A PUSCH can be transmitted corresponding to a PDCCH (UL grant) and/or a PHICH (NACK).

Referring to FIG. 10, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 6 | | | | 4 | 6 | |
| 1 | | | 6 | | | 4 | | | 6 | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

FIG. 11 illustrates PUSCH transmission timing when UL-DL configuration #1 is configured. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 12:
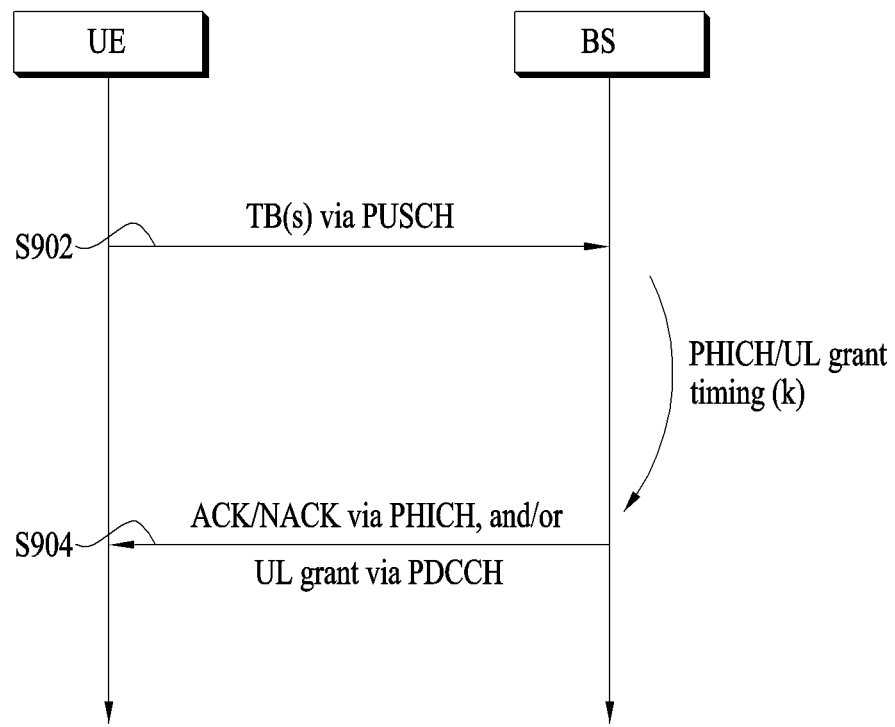
FIGS. 12 and 13 illustrate TDD DL ACK/NACK transmission timing in a single cell case.
Figure 13:
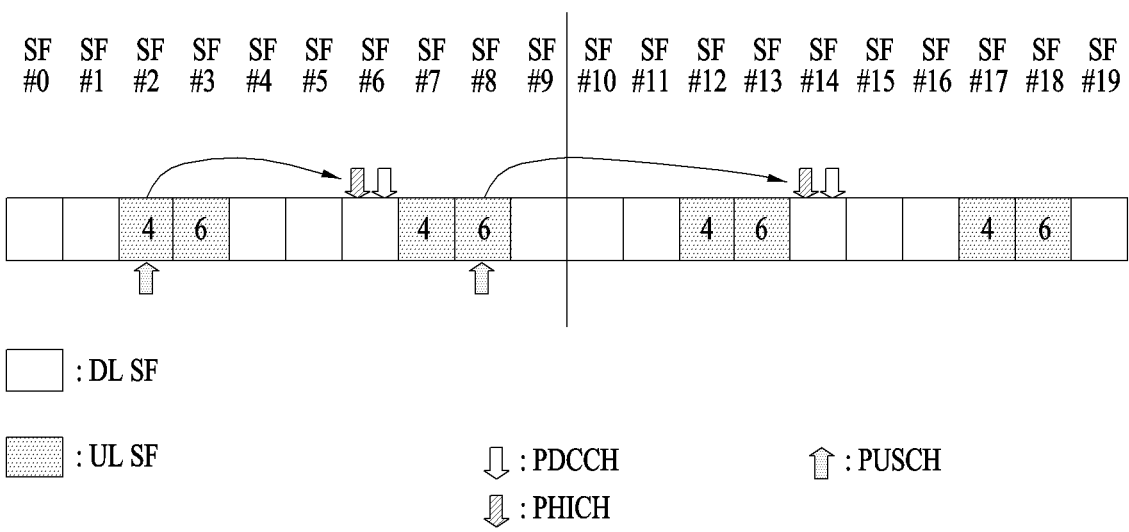

FIGS. 12 and 13 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 12, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 13 illustrates PHICH/UL grant transmission timing when UL-DL configuration #1 is configured. In the figure, SF #0 to #9 and SF #10 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14).

PHICH resource allocation will now be described. When a PUSCH is transmitted in subframe # n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH⇒SF #13: PUSCH (RTT: 11 SFs)⇒SF #24: PUSCH (RTT: 11 SFs)⇒SF #37: PUSCH (RTT: 13 SFs)⇒SF #48: PUSCH (RTT: 11 SFs)⇒SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 14:
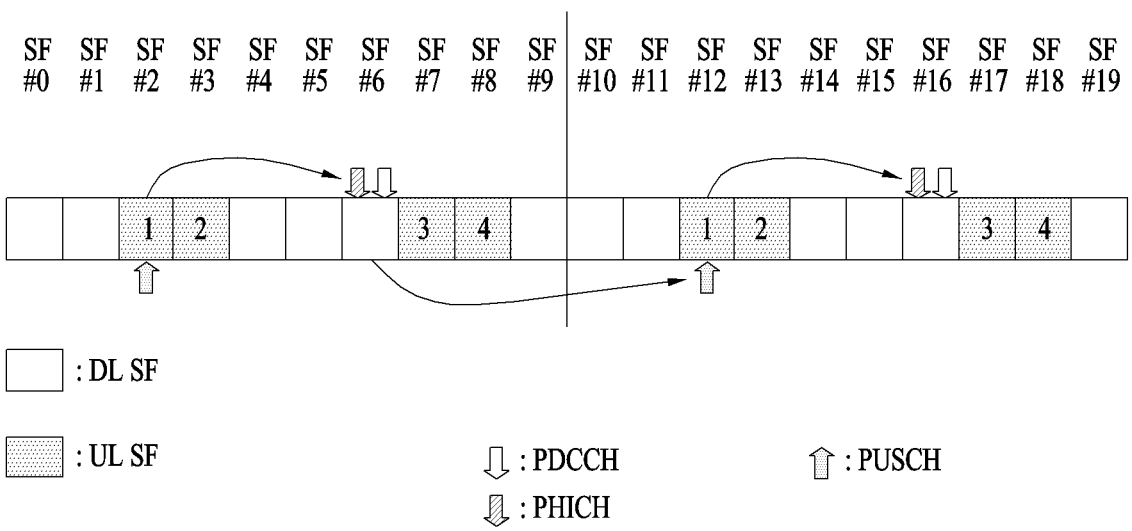
FIG. 14 illustrates a TDD HARQ (Hybrid Automatic Repeat request) process in a single cell situation.

FIG. 14 illustrates a synchronous UL HARQ process when UL-DL configuration #1 is configured. Numerals in blocks denote UL HARQ process numbers. The synchronous UL HARQ process shown in FIG. 14 corresponds to a normal HARQ process. Referring to FIG. 14, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal can be received in SF #6 and a (retransmission) PUSCH signal (e.g. RV=2) corresponding to the initial PUSCH signal can be transmitted in SF #12. Accordingly, 4 UL HARQ processes having an RTT (Round Trip Time) of 10 SFs (or 10 ms) are present in case of UL-DL configuration #1.

Figure 15:
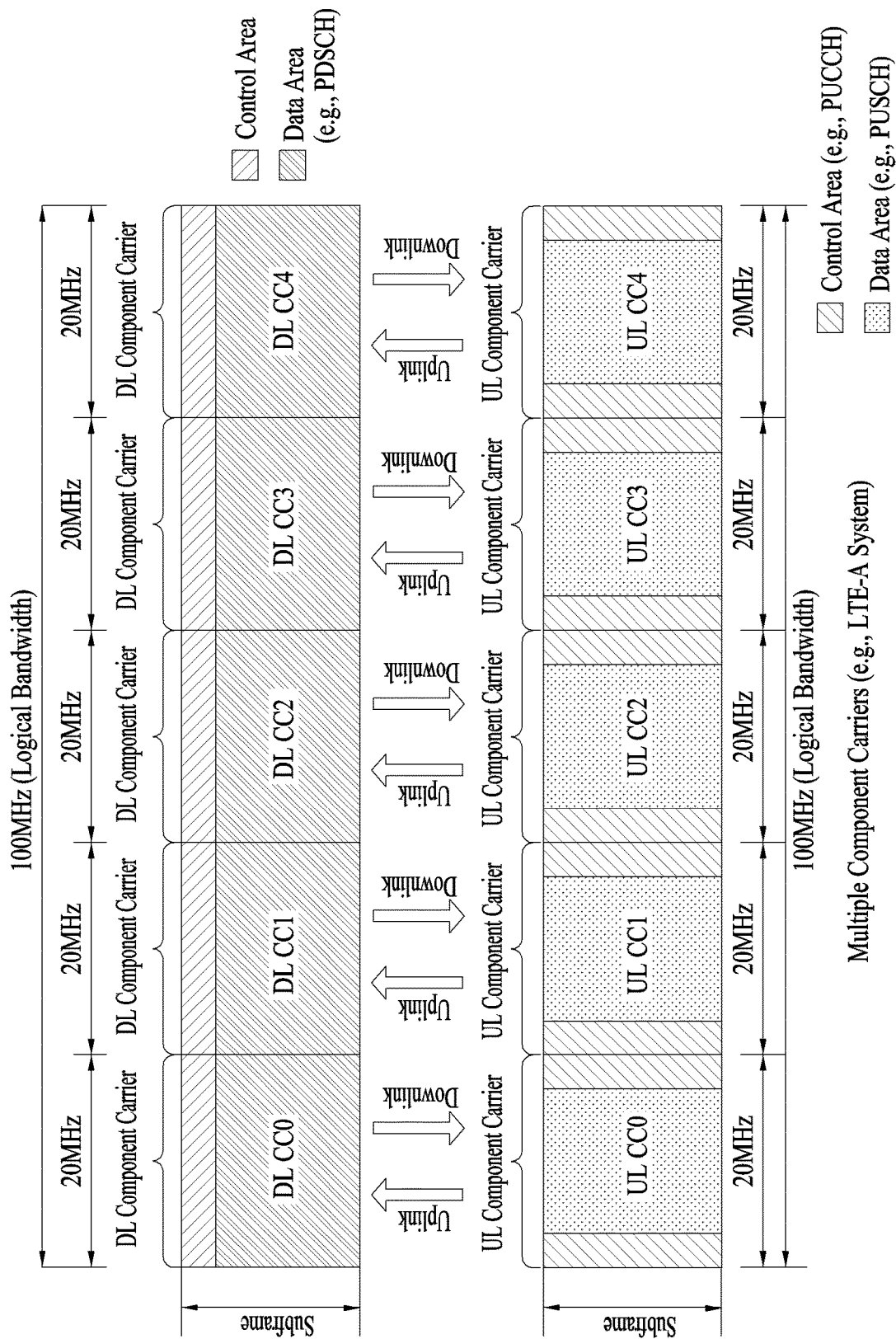
FIG. 15 illustrates a carrier aggregation (CA)-based wireless communication system.

FIG. 15 illustrates carrier aggregation (CA) communication system.

Referring to FIG. 15, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 16:
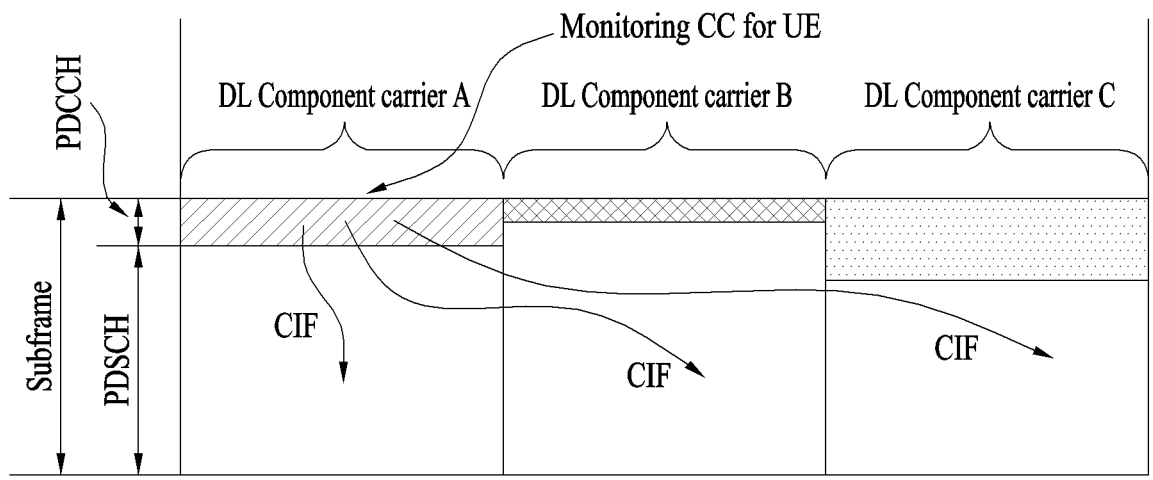
FIG. 16 illustrates cross-carrier scheduling.

FIG. 16 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment

Figure 17:
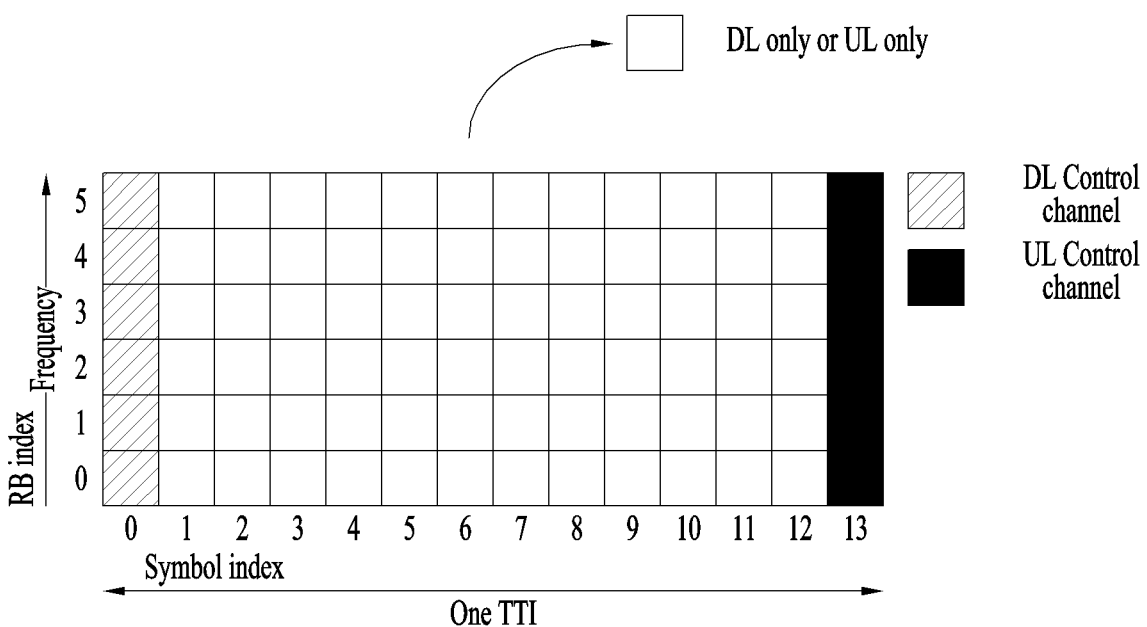
FIG. 17 illustrates a structure of a self-contained subframe.

Meanwhile, a next generation RAT (radio access technology) is considering a self-contained subframe to minimize data transmission latency. FIG. 17 illustrates a structure of a self-contained subframe. In FIG. 17, oblique line areas indicate DL control regions and black colored areas indicate UL control regions. Areas having no mark may be used for DL data transmission or UL data transmission. In this structure, DL transmission and UL transmission are performed in due order within one subframe, whereby DL data transmission and UL ACK/NACK transmission can be performed within the subframe. Or, UL grant transmission and UL data reception can be performed within the subframe as well. As a result, the time required for data re-transmission may be reduced when an error occurs in data transmission, whereby latency of final data transfer may be minimized.

Examples of the self-contained subframe type that may be configured in the system may consider four subframe types as follows.

DL control period+DL data period+GP (guard period)+ UL control period
DL control period+DL data period
DL control period+GP+UL data period+UL control period
DL control period+GP+UL data period PDFICH, PHICH, and PDCCH can be transmitted in a DL control period and PDSCH can be transmitted in a DL data period. PUCCH can be transmitted in a UL control period and PUSCH can be transmitted in a UL data period. A time gap for switching from a transmission mode to a reception mode or vice versa is required for an eNB and a UE. A GP provides the time gap. To this end, some OFDM symbols at the time when DL is switched to UL in the self-contained subframe structure are configured as a GP.

Unlike a legacy LTE system operating based on a fixed DL/UL SF configuration, a new RAT system may consider an operation of dynamically changing a DL/UL resource (e.g., data region) portion or a DL/UL resource portion within multiple SF durations according to a DL/UL traffic status based on the self-contained SF type mentioned earlier in FIG. 17 (i.e., dynamic TDD). Meanwhile, a self-contained SF type may correspond to a structure that a DL transmission duration and a UL transmission duration are sequentially configured in a single SF. Based on the above-mentioned DL/UL resource configuration, it may consider a method of performing both DL data scheduling/transmission (from a base station) and HARQ-ACK feedback transmission (from a UE) in response to the DL data scheduling/transmission within a single SF and/or a method of performing both UL grant transmission (from a base station) and UL data transmission (from a UE) in response to the UL grant transmission within a single SF.

A self-contained SF type can be associated with two issues described in the following.

First, when a GP is configured between a DL transmission duration and a UL transmission duration, it is not easy to complete all processes in a UE with a short GP (Issue 1). For example, DL scheduling can be performed only when decoding on a DL data channel, processing in a MAC layer, RX-to-TX switching, encoding of a HARQ-ACK signal, UL power control, UL TA adjustment, and the like are all completed within a GP. UL scheduling can be performed only when blind decoding on a UL grant, processing in a MAC layer, RX-to-TX switching, encoding of a UL data channel, UL power control, UL TA adjustment, and the like are all completed within a GP. In this case, if it is necessary for a UE to increase a GP length in consideration of the time taken for the abovementioned processes, it may cause resource waste due to the increase of GP overhead and bring about a restriction on a schedulable DL/UL data (e.g., TB) size.

Second, unnecessarily long DL/UL data retransmission (grant) preparation time in a base station (having processing capability better than processing capability of a UE) can be provided compared to processing time of a UE. The processing time of the UE is completed within a short GP (Issue 2). For example, in case of DL scheduling, the last partial symbol of a self-contained SF is configured as a HARQ-ACK transmission duration for DL data reception. In this case, if HARQ-ACK feedback received via the HARQ-ACK transmission duration corresponds to NACK, it is difficult to transmit a retransmission DL grant in a very next SF in response to the HARQ-ACK feedback. In this case, it is necessary for a base station to stand by as much as one SF for the retransmission DL grant. As a different example, in case of UL scheduling, a UL data transmission duration can be configured up to the last symbol within a self-contained SF. In this case, if a decoding result of a UL data received via the UL data transmission duration corresponds to NACK, it is difficult to transmit a retransmission UL grant in a very next SF in response to the decoding result. In this case, it is necessary for a base station to stand by as much as one SF for the retransmission UL grant. Consequently, although data scheduling/transmission and feedback are completed within a single SF based on a self-contained SF type, the minimum HARQ retransmission RTT (round trip time) should be determined by two SF durations.

In the following description, the present invention proposes an efficient SF type and a HARQ operation method based on the SF type in consideration of the aforementioned two issues (i.e., processing time burden in a UE and retransmission scheduling latency in a base station). In the present invention, an SF corresponds to a basic time unit for transmitting a signal. For the definition of each duration within an SF, it may refer to FIG. 17. Each duration within an SF corresponds to a time duration and can be configured by one or more OFDM(A) symbols. And, assume that a DL grant (i.e., DL scheduling information) and DL data corresponding to the DL grant are received in the same SF. And, a DL/UL grant is received via PDCCH, DL data is received via PDSCH, and UL data can be received via PUSCH. The self-contained subframe shown in FIG. 17 can be cross-concatenated with various SF types proposed in the present invention. The SF types proposed in the present invention can be combined in various ways according to an indication of a network (e.g., base station) in consideration of traffic status, and the like. An SF configuration/combination can be semi-statically or dynamically changed.

Proposed SF type 1 for DL/UL simultaneous scheduling

An SF type 1 can be configured as follows in time order within an SF.

SF type 1=[DL control duration+DL data duration+GP+ UL data duration+UL control duration]

In case of the SF type 1, DL grant/DL data scheduling/transmission, HARQ-ACK feedback transmission in response to the DL grant/DL data scheduling/transmission, UL grant transmission, and UL data transmission in response to the UL grant transmission can be performed within a single SF. In terms of processing in a UE and data scheduling latency, 1) the SF type 1 can provide processing time as much as (GP+UL data duration) between DL data reception and HARQ-ACK transmission, 2) the SF type 1 can provide processing time as much as (DL data duration+GP) between UL grant reception and UL data transmission, and 3) the SF type 1 may have a merit in that it is able to simultaneously perform scheduling on DL data and scheduling on UL data within a single SF.

Although the SF type 1 is able to relax the problem of the issue 1, the SF type 1 may have a problem for the issue 2.

Proposed SF type 2 for DL/UL simultaneous scheduling

An SF type 2 can be configured as follows in time order within an SF.

SF type 2=[UL data duration+UL control duration+DL control duration+DL data duration]

Figure 18:
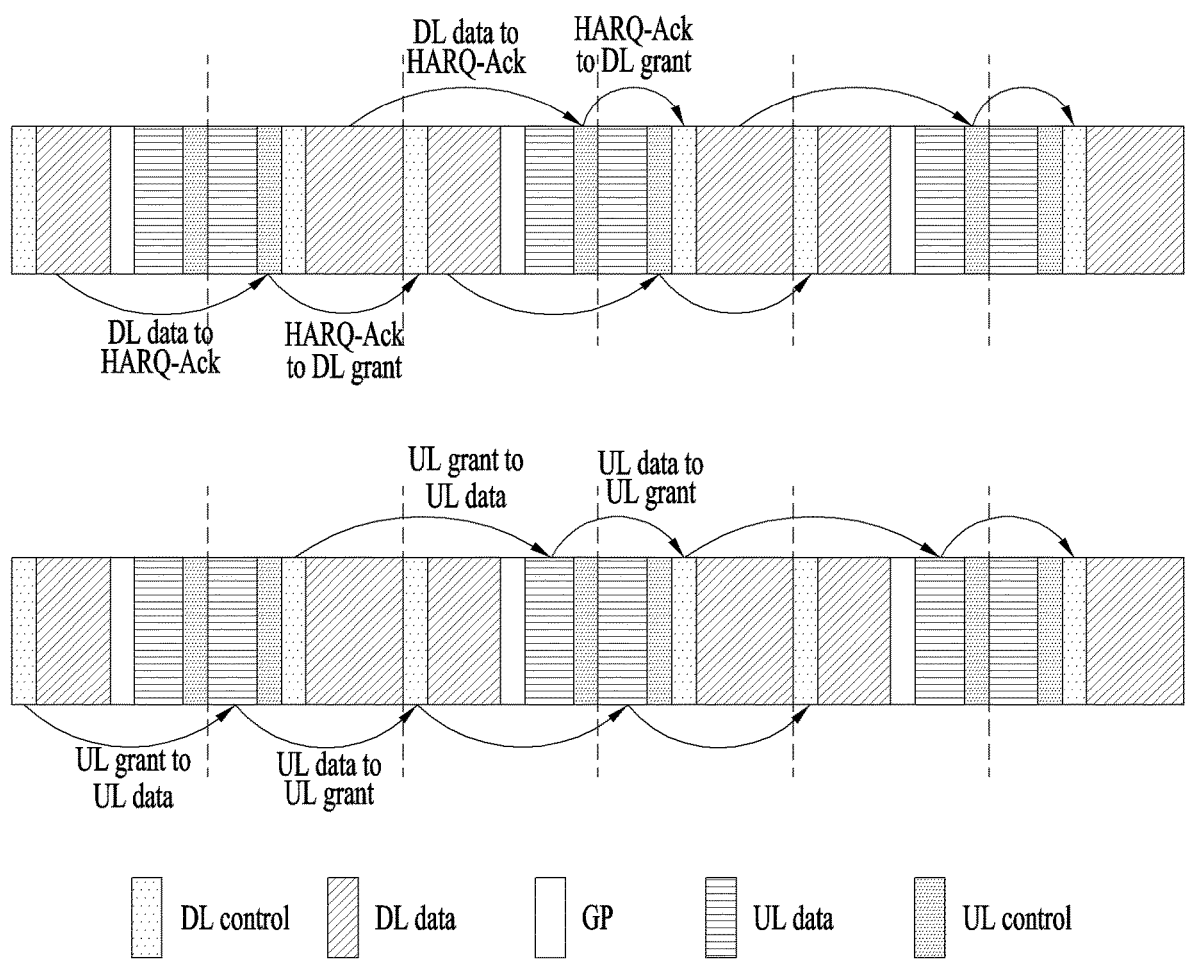
FIGS. 18 to 24 illustrate a signal transmission procedure according to the present invention.

The SF type 2 can be cross-concatenated with the SF type 1 in a form shown in FIG. 18. As shown in FIG. 18, DL grant/DL data scheduling/transmission, HARQ-ACK feedback transmission in response to the DL grant/DL data scheduling/transmission, UL grant transmission, and UL data transmission in response to the UL grant transmission can be performed over two SFs. In terms of processing in a UE and data scheduling latency, 1) a combination of the SF types 1 and 2 can provide processing time as much as a single SF (e.g., a (DL control+DL data+GP+UL data) duration or a (GP+UL data+UL control+UL data) duration) between DL data reception and HARQ-ACK transmission, 2) the combination of the SF types 1 and 2 can provide processing time as much as a single SF (e.g., a (DL data+DL control+DL data+GP) duration or a (DL data+GP+UL data+ UL control) duration) between UL grant reception and UL data transmission, and 3) the combination of the SF types 1 and 2 may have a merit in that it is able to reduce GP overhead via a configuration of the SF type 2.

Proposed SF type 3 for DL heavy traffic situation

An SF type 3 can be used for configuring a plurality of SFs centering on DL scheduling in a DL heavy traffic situation. The SF type 3 can be configured in 3 types described in the following in time order.

SF type 3-1=[DL control duration+DL data duration+GP+ UL control duration]

SF type 3-2=[UL control duration+DL control duration+ DL data duration]

SF type 3-3=[DL control duration+GP+UL control duration+DL data duration]

Figure 19:
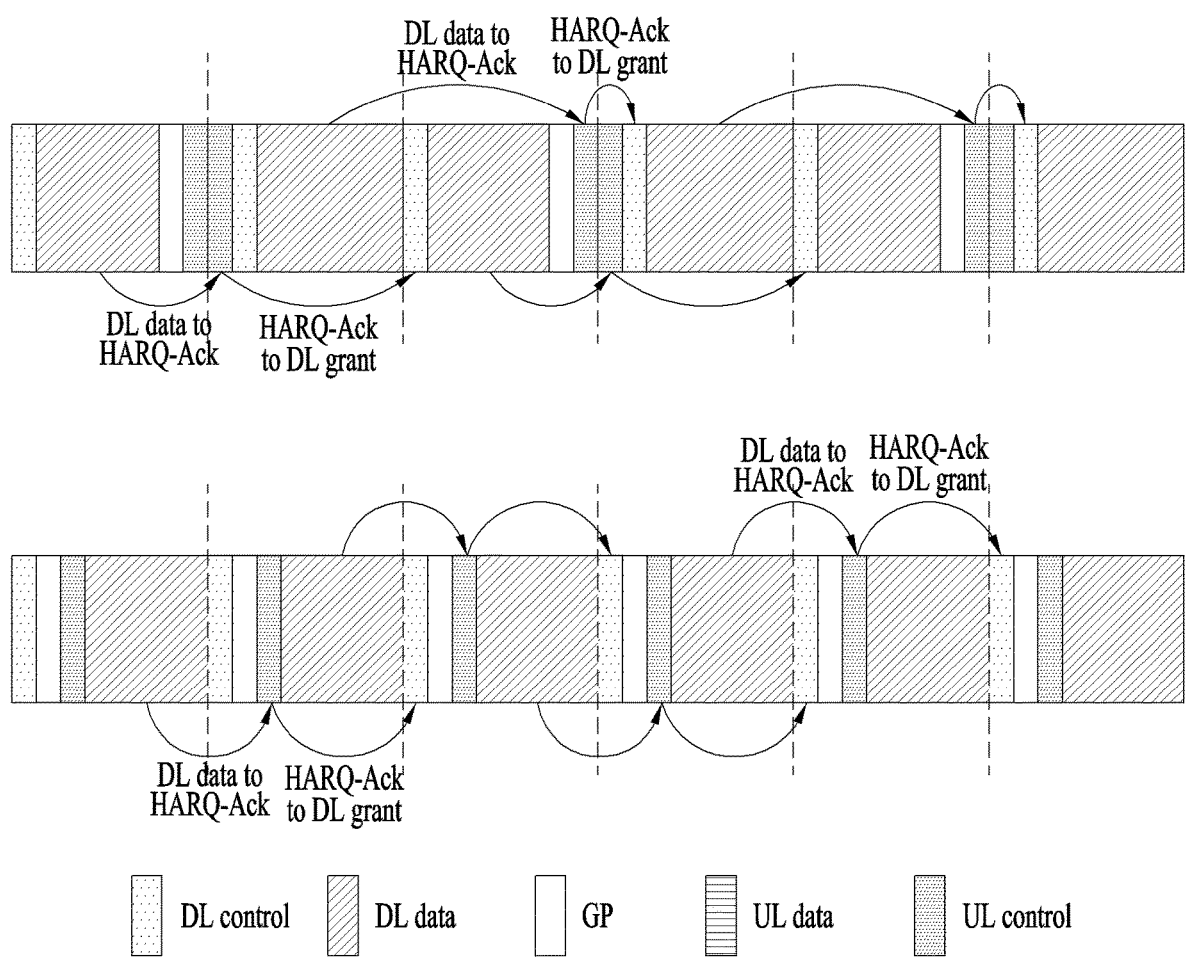

In case of the SF type 3, as shown in FIG. 19, Alt 1) the SF type 3-1 is cross-concatenated with the SF type 3-2 or Alt 2) the SF type 3-3 can be configured only in a manner of being concatenated. As shown in FIG. 19, DL grant/DL data scheduling/transmission and HARQ-ACK feedback transmission in response to the DL grant/DL data scheduling/transmission can be performed over two SFs.

Meanwhile, in order to more secure a time interval between HARQ-ACK reception and retransmission DL grant transmission (of a base station in Alt 1) and a time interval between DL data reception and HARQ-ACK transmission in response to the DL data reception (of a UE in Alt 2), the SF type 3 can be modified into a form described in the following. A single DL data channel (e.g., TB) can be scheduled/transmitted over 2 separated DL data durations of the modified SF type 3. Or, an individual DL data can be scheduled/transmitted in each of the DL data durations.

Modified SF type 3-1=[DL data duration+DL control duration+DL data duration+GP+UL control duration]

Modified SF type 3-2=[UL control duration+DL data duration+DL control duration+DL data duration]

Modified SF type 3-3=[DL control duration+DL data duration+GP+UL control duration+DL data duration]

Proposed SF type 4 for UL heavy traffic situation

An SF type 4 can be used for configuring a plurality of SFs centering on UL scheduling in a UL heavy traffic situation. The SF type 4 can be configured in 2 types described in the following in time order.

SF type 4-1=[DL control duration+GP+UL data duration]

SF type 4-2=[UL data duration+DL control duration]

Figure 20:
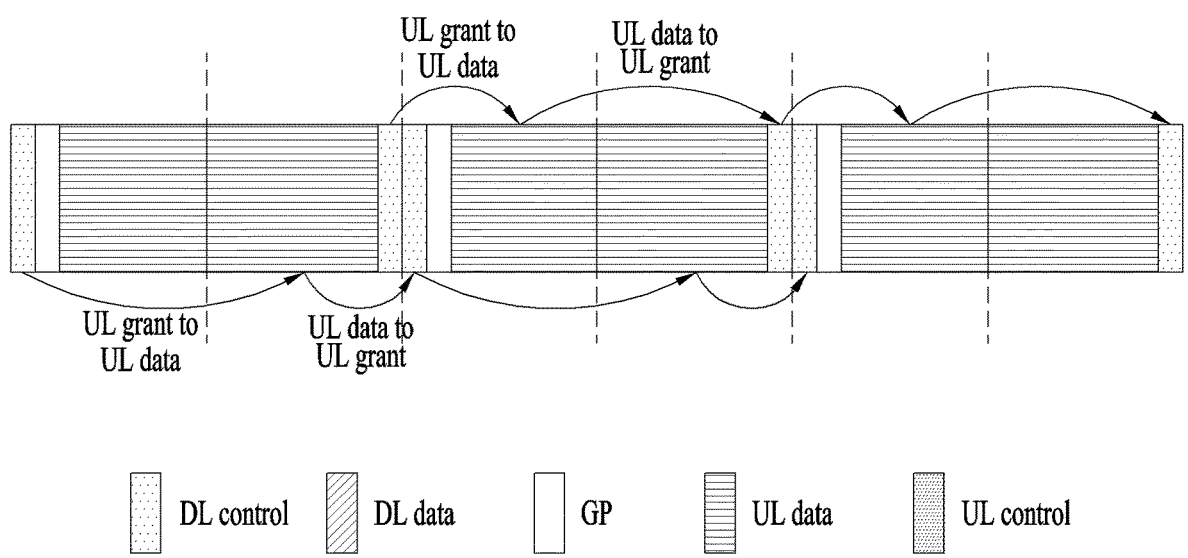

As shown in FIG. 20, the SF type 4 can be configured in a form that the SF type 4-1 is cross-concatenated with the SF type 4-2. As shown in FIG. 20, UL grant transmission and UL data transmission in response to the UL grant transmission can be performed over two SFs.

Meanwhile, in order to more secure a time interval between UL data reception and retransmission UL grant transmission (in a base station) and a time interval between UL grant reception and UL data transmission in response to the UL grant reception (in a UE), the SF type 4 can be modified into a form described in the following. A single UL data channel (e.g., TB) can be scheduled/transmitted over 2 separated UL data durations of the modified SF type 4. Or, an individual UL data can be scheduled/transmitted in each of the UL data durations.

Modified SF type 4-1=[UL data duration+DL control duration+GP+UL data duration]

Modified SF type 4-2=[UL data duration+DL control duration+GP+UL data duration+UL control duration]

In the following, a method of configuring a new SF type based on a mini-SF combination capable of including generalization of a modified SF type configuration is proposed. A single mini-SF can be configured by a forepart symbol duration or a rear part symbol duration of a single SF. A symbol duration length (e.g., number of symbols) of two mini-SFs constructing the forepart and the rear part of a single SF can be identically or differently configured.

mini-SF type D-1=[DL control duration+DL data duration+GP+UL control duration]

mini-SF type D-2=[DL control duration+GP+UL control duration+DL data duration]

mini-SF type D-3=[DL control duration+DL data duration]

mini-SF type D-4=[DL data duration+GP+UL control duration]

mini-SF type D-5=[DL data duration]

mini-SF type D-6=[UL control duration+DL control duration+DL data duration]

mini-SF type D-7=[UL control duration+DL data duration]

mini-SF type U-1=[DL control duration+GP+UL data duration+UL control duration]

mini-SF type U-2=[DL control duration+GP+UL data duration]

mini-SF type U-3=[DL control duration+GP+UL data duration]

mini-SF type U-4=[UL data duration+UL control duration]

mini-SF type U-5=[UL data duration]

mini-SF type U-6=[UL control duration+DL control duration+GP+UL data duration]

mini-SF type U-7=[UL control duration+UL data duration]

Specifically, the forepart and the rear part of a single SF can be configured by a mini-SF type D-k and a mini-SF type D-n, respectively. In this case, k and n may have the same value or a different value. If the last of the mini-SF type D-k is configured by a DL duration and the first of the mini-SF type D-n is configured by a UL duration, it may add a GP between the two mini-SF types. Similarly, the forepart and the rear part of a single SF can be configured by a mini-SF type U-k and a mini-SF type U-n, respectively. In this case, k and n may have the same value or a different value. Meanwhile, similar to the aforementioned description, a single DL/UL data channel (e.g., TB) can be scheduled/transmitted over two separated DL/UL data durations within a (single) SF configured by a combination of two mini-SFs. Or, an individual DL/UL data can be scheduled/transmitted in each of the DL/UL data durations.

In addition, the forepart and the rear part of a single SF can be configured by a mini-SF type D-k and a mini-SF type U-n, respectively. Or, the forepart and the rear part of a single SF can be configured by a mini-SF type U-k and a mini-SF type D-n, respectively. And, it may be able to configure a single SF using a mini-SF D-k only or a mini-SF type U-n only. It may be able to configure a single SF by combining (concatenating) the M (≥3) number of mini-SF types. Meanwhile, the mini-SF combination-based SF type (including a self-contained SF type) can also be configured in a normal UL SF (and/or a special SF) of a legacy TDD system based on a fixed DL/UL SF configuration and/or a UL SF of a UL carrier in FDD system (to perform latency reduction or traffic adaptation).

In the aforementioned proposals (including FIGS. 18 to 20), all or a part of HARQ timing may have a form to which a specific SF offset is added. HARQ timing includes DL data-to-HARQ-ACK timing, HARQ-ACK-to-DL grant timing (for DL retransmission), UL grant-to-UL data timing, UL data-to-UL grant timing (for UL retransmission). An SF offset value added to the HARQ timing can be differently configured according to processing capability of a UE, a DL/UL data (e.g., TB) size, and the like.

Meanwhile, when DL/UL data scheduling/transmission is performed based on the proposed SF types (or other SF types), DL/UL control (and/or GP) duration information (e.g., starting/ending symbol index) is identified in advance. Then, a DL/UL data signal is mapped/transmitted/received while the DL/UL control duration is excluded. Or, HARQ-ACK feedback transmission corresponding to DL/UL data transmission, DL/UL grant detection, and the like can be performed. In particular, information on a DL/UL control (and/or GP) duration belonging to a specific SF (belonging/adjacent/corresponding to a scheduled DL/UL data duration) can be indicated via a DL/UL grant or a specific broadcast signal (e.g., UE-common DCI).

As a different approach (or a specific combination of mini-SF types, it may consider a new SF type described in the following in a manner of configuring a DL control duration in the first partial symbol (within an SF) and configuring a UL control duration in the center partial symbol. In this case, the remaining symbols except the DL/UL control duration (within an SF) can be configured as a DL data duration or a UL data duration. As an example of a DL HARQ operation based on the new SF type, HARQ-ACK feedback in response to DL data received in an SF # n is transmitted via a UL control duration in an SF #(n+1) and retransmission scheduling (i.e., DL grant transmission) for the DL data can be performed in an SF #(n+2). As an example of a UL HARQ operation, UL data transmission in response to UL grant received in an SF # n is performed via an SF #(n+1) and retransmission scheduling (i.e., UL grant transmission) for the UL data can be performed in an SF #(n+3).

new SF type 1-1=[DL control duration+DL data duration+GP+UL control duration+DL data duration]

new SF type 1-2=[DL control duration+GP+UL data duration+UL control duration+UL data duration]

Meanwhile, in case of the new SF types 1-1 and 1-2, (GP+UL control) duration or (UL control) duration positioned at the center may not be configured according to a configuration of UCI transmission timing. It may be able to indicate whether or not a DL/UL data signal is mapped/transmitted/received to the duration positioned at the center via a DL/UL grant that schedules DL/UL data transmission in a corresponding SF. Or, whether to configure the (GP+UL control) duration or the (UL control) duration can be indicated via a specific broadcast signal (e.g., UE-common DCI). In case of the new SF type 1-2, it may not configure a first (DL control+GP) duration according to whether or not scheduling DCI is transmitted. Whether to map/transmit a UL data signal in the first (DL control+GP) duration can be indicated via a UL grant that schedules UL data transmission in a corresponding SF. Or, information on whether or not the (DL control+GP) duration is configured can be indicated via a specific broadcast signal (e.g., UE-common DCI).

And, it may consider a new SF type described in the following in a form that a DL control duration for transmitting a DL grant is configured in a partial symbol positioned at the first (within an SF), a DL control duration for transmitting a UL grant is configured in a partial symbol positioned at the center, and a UL control duration is configured in a partial symbol positioned at the last. In this case, the remaining symbols except the DL/UL control duration (within an SF) can be configured as a DL data duration or a UL data duration. As an example of a UL HARQ operation based on the new SF type, UL data is transmitted via an SF #(n+1) in response to a UL grant received in an SF # n and retransmission scheduling (i.e., UL grant transmission) for the UL data can be performed in an SF #(n+2). As an example of a DL HARQ operation, HARQ-ACK feedback is transmitted via a UL control duration within the SF #(n+1) in response to DL data received in the SF # n and retransmission scheduling (i.e., DL grant transmission) for the DL data can be performed in an SF #(n+3).

new SF type 2-1=[DL control+DL data+DL control+DL data+GP+UL control]

new SF type 2-2=[DL control+GP+UL data+DL control+GP+UL data+UL control]

Meanwhile, in case of the new SF types 2-1 and 2-2, a (GP+UL control) duration or a (UL control) duration positioned at the last may not be configured according to a configuration of the timing at which UCI is transmitted. Based on this, it may be able to indicate information on whether or not a DL/UL data signal is mapped/transmitted/received in the corresponding duration positioned at the last via a DL/UL grant that schedules DL/UL data transmission in a corresponding SF. Or, it may be able to indicate information on whether or not the (GP+UL control) duration or the (UL control) duration is configured via a specific broadcast signal (e.g., UE-common DCI). And, in case of the new SF types 2-1 and 2-2, a (DL control) duration or a (DL control+GP) duration positioned at the center may not be configured depending on whether or not scheduling DCI is transmitted. In consideration of this, it may be able to indicate information on whether or not a DL/UL data signal is mapped/transmitted/received in the duration positioned at the center via a DL/UL grant that schedules DL/UL data transmission in a corresponding SF. Or, it may be able to indicate information on whether or not the (DL control) duration or the (DL control+GP) duration is configured via a specific broadcast signal (e.g., UE-common DCI). And, in case of the new SF type 2-2, a (DL control+GP) duration positioned at the first may not be configured depending on whether or not scheduling DCI is transmitted. In consideration of this, it may be able to indicate information on whether or not a UL data signal is mapped/transmitted/received in the duration positioned at the first via a UL grant that schedules UL data transmission in a corresponding SF. Or, it may be able to indicate information on whether or not the (DL control+GP) duration is configured via a specific broadcast signal (e.g., UE-common DCI).

Meanwhile, all of the aforementioned 4 new SF types (i.e., 1-1, 1-2, 2-1, and 2-2) can be switched/changed according to an SF. Or, in order to achieve a specific object (e.g., in order to minimize DL/UL HARQ operation latency), a part of the new SF types (e.g., two new SF types (i.e., 1-1 and 2-2)) can be switched/changed only according to an SF.

Figure 21:
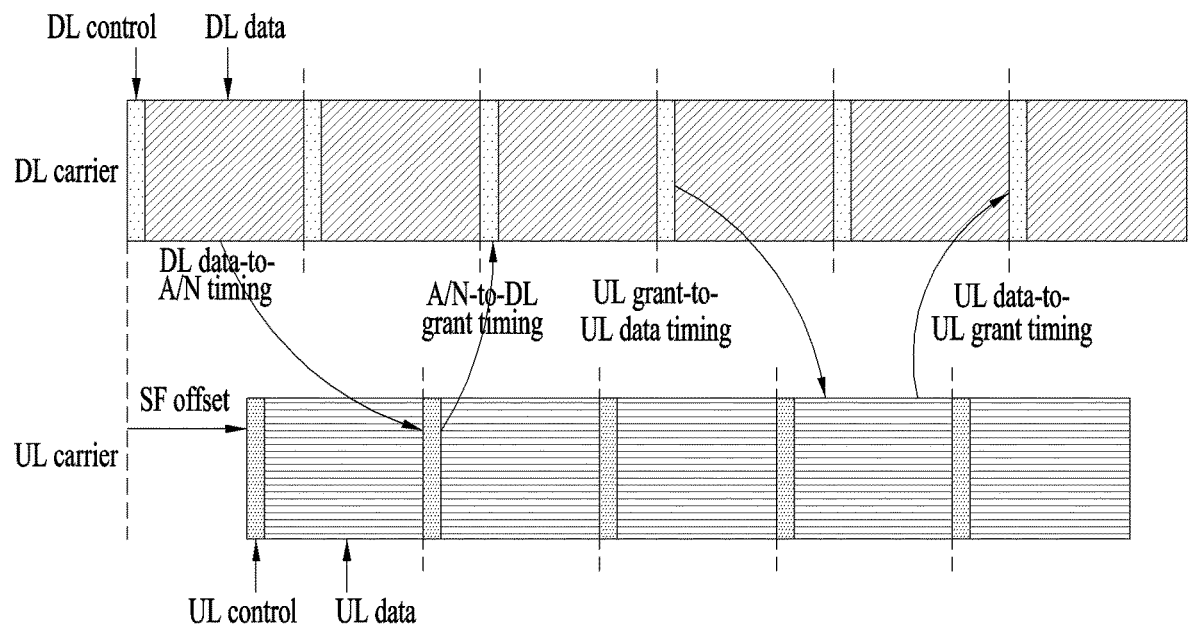
Figure 22:
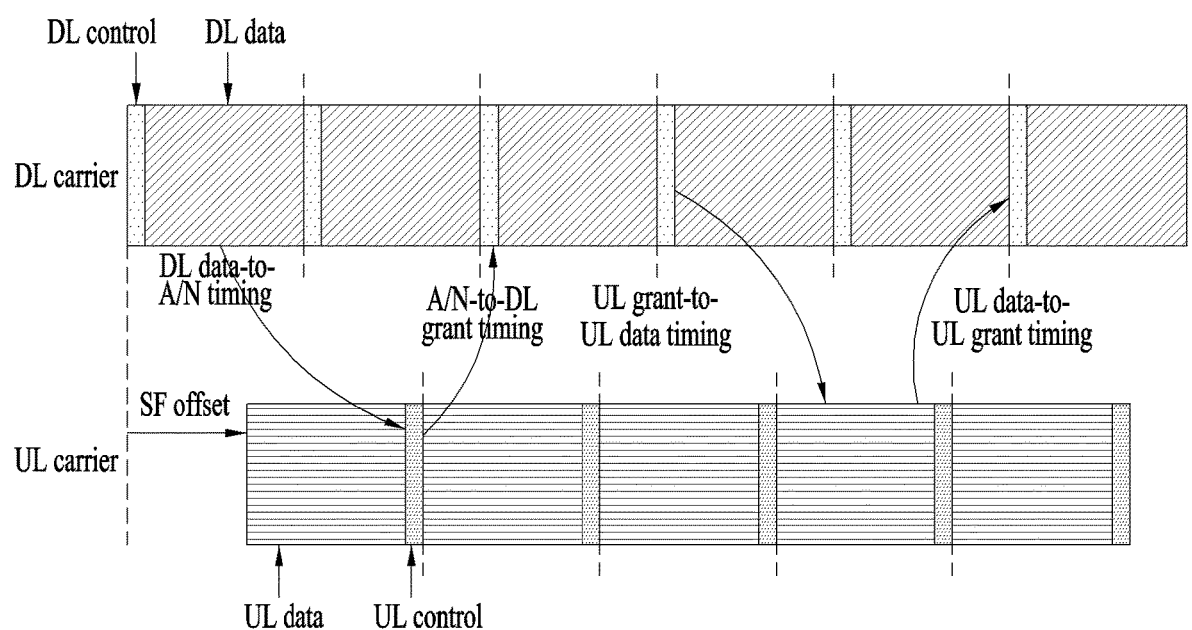

Meanwhile, in FDD situation, a DL SF on a DL carrier and a UL SF on a UL carrier can be configured as follows. In particular, a DL control duration is configured in a partial symbol positioned at the first of the DL SF and a UL control duration can be configured in a partial symbol positioned at the first or the last of the UL SF. In this case, in order to configure each of delay between DL data reception and HARQ-ACK transmission and delay between HARQ-ACK transmission and retransmission DL grant by a single SF (i.e., minimum RTT (round trip time) between DL data transmission and retransmission is configured by 2 SFs) and configure each of delay between UL grant reception and UL data transmission and delay between UL data transmission and retransmission UL grant by a single SF (i.e., minimum RTT between UL data transmission and retransmission is configured by 2 SFs), it may be able to intentionally apply a fractional SF offset to a boundary between the DL SF and the UL SF. For example, a timing gap between the start timing of the DL SF and the start timing of the UL SF can be configured by a gap as much as +½ SF or −½ SF. Information on the timing gap can be signaled to a UE via an initial access procedure or a random access procedure (e.g., transmission of system information, etc.). FIGS. 21 and 22 illustrate a DL/UL HARQ timeline (with minimum RTT) based on the abovementioned method. In this case, each of DL and UL may operate as two HARQ processes.

FDD DL SF type 1=[DL control duration+DL data duration]

FDD UL SF type 1=[UL control duration+UL data duration] or [UL data duration+UL control duration]

In case of the FDD UL SF type 1, a (UL control) duration may not be configured according to a configuration of the timing at which UCI is transmitted. Based on this, it may be able to indicate information on whether or not a UL data signal is mapped/transmitted in the corresponding duration via a UL grant that schedules UL data transmission in a corresponding SF. Or, it may be able to indicate information on whether or not the (UL control) duration is configured via a specific broadcast signal (e.g., UE-common DCI).

Meanwhile, L_UP corresponding to U-plane latency can be calculated based on equation 1 under the assumption that an SF and a TTI are the same. The TTI corresponds to time taken for transmitting a transport block (TB) and can be defined in a manner of being different from the SF. In order to transmit DL (or UL) data, it is necessary to wait until a DL SF (or UL SF) (or TTI). Hence, delay time occurs. In equation 1, frame_alignment_time indicates the delay time. p corresponds to a retransmission probability and RTT corresponds to time taken for performing retransmission. The retransmission can be performed more than one time. Hence, in order to precisely calculate the L_UP, it may also be able to calculate additional retransmission time (p^2*2RTT+p^3*3RTT+ . . . ). However, if the p corresponds to 0.1, since an occurrence probability of p^2 is very low, it may be able to ignore the additional retransmission time.

$$L\_UP = \text{Frame\_alignment\_time} + \text{encoding\_time} + TTI + \text{decoding\_time} + p*RTT \quad \text{[Equation 1]}$$

Figure 23:
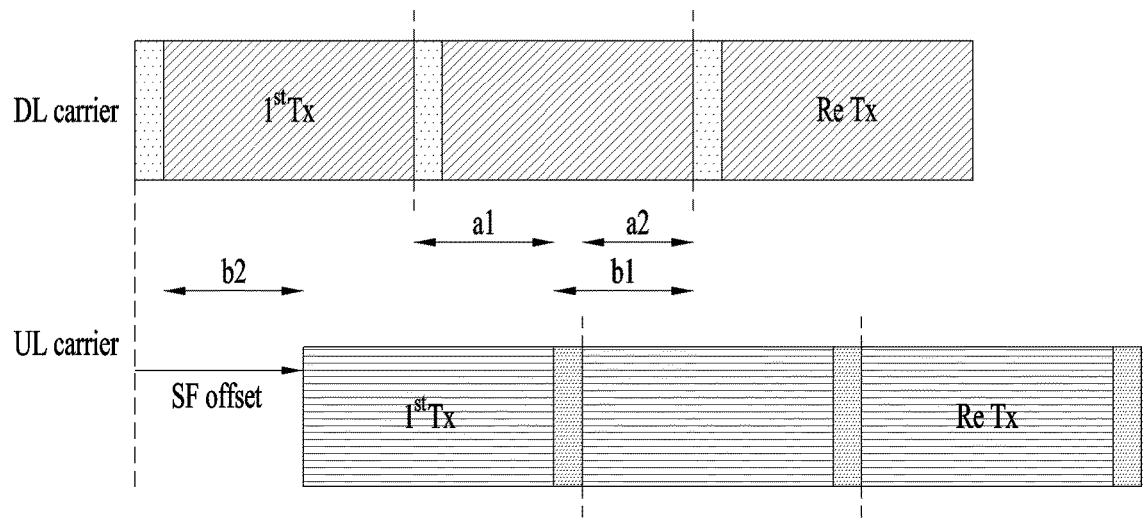
Figure 24:
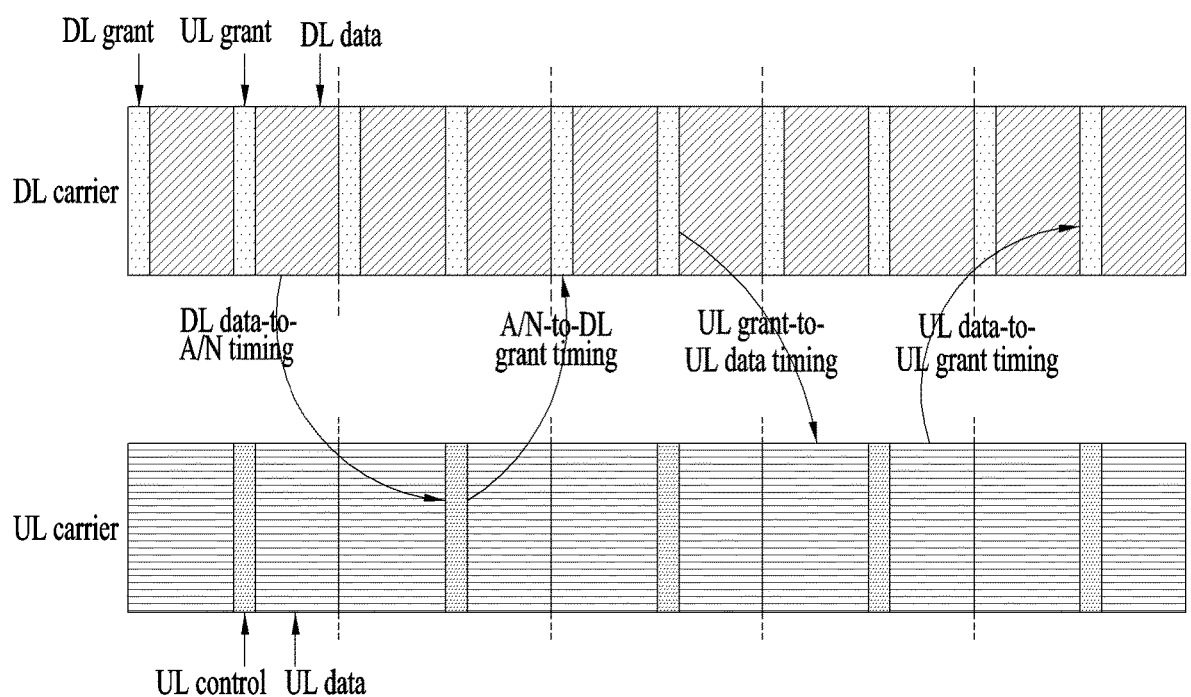

For example, when latency requirement is given by 0.5 ms and a TTI is configured by 0.2 ms, as shown in FIG. 23, it may consider a case that 0.5 TTI offset is applied to a UL SF and (maximum) two HARQ processes are operating. In this case, if 0.4 TTI is required for decoding DL data (in a UE) and the total 0.4 TTI is required for receiving ACK/NACK (in a base station), scheduling and encoding DL data, the latency requirement of 0.5 ms can be satisfied by 0.2 ms TTI based on the calculation described in the following.

$$L\_UP = \text{Frame\_alingment\_time} + \text{encoding\_time} + TTI + \text{decoding\_time} + p*RTT$$
$$= 0.5TTI + 0.4TTI + TTI + 0.4TTI + 0.1*2*TTI$$

= 2.5*TTI*

= 0.5 ms

For generalization, it may consider a situation shown in FIG. 23. In this case, signal processing time for satisfying L_UP=2.5 TTI (e.g., in case of 0.2 ms TTI, L_UP=0.5 ms) is proposed in the following.
1) In case of DL data scheduling
   A. TTI: (first) DL data transmission time
   B. a1 TTI: DL data decoding time+ACK/NACK encoding time
   C. (1-a1-a2) TTI: ACK/NACK transmission time
   D. a2 TTI: ACK/NACK decoding time+scheduling & DL data encoding time
2) In case of UL data scheduling
   A. b2 TTI: UL grant decoding & UL data encoding time
   B. 1.0*TTI: (first) UL data transmission time
   C. b1 TTI: UL data decoding time+scheduling & UL grant encoding time
   D. 0.1 TTI: UL grant transmission time Meanwhile, an SF offset can be used as a TA offset value which is applied (on the basis of DL reception timing) when a UE transmits a PRACH preamble in a random access procedure. It is preferable to set a limit on a TA value to make the TA value to be equal to or less than a specific level in consideration of processing (e.g., DL data decoding and/or UL data encoding) delay of a UE based on a fast HARQ timeline. Hence, if a TA command (final accumulation TA to which the TA command is applied) received from a base station is configured by a value exceeding a specific level (i.e., maximum TA value), 1) a UE ignores the TA command without applying the TA command (i.e., a previous TA command (accumulation TA to which the previous TA command is applied) is applied), 2) the UE operates in a state that the TA value and a specific level (i.e., maximum TA value) are identically configured. In addition, the UE can report information on processing (e.g., DL data decoding and/or UL data encoding) delay of the UE or information corresponding to the maximum TA value capable of being applied to UL transmission to the base station at the appropriate timing.

As a different method, it may consider a FDD SF type described in the following in a form that a DL control duration for transmitting a DL grant is configured in a partial symbol positioned at the first, a DL control duration for transmitting a UL grant is configured in a partial symbol positioned at the center of a DL SF, and a UL control duration is configured in a partial symbol positioned at the center of a UL SF. In this case, although a boundary of the DL SF is matched with a boundary of the UL SF (i.e., there is no SF offset), the minimum RTT between DL data transmission and retransmission and the minimum RTT between UL data transmission and retransmission can be configured by 2 SFs. FIG. 14 illustrates a DL/UL HARQ timeline (with minimum RTT) based on the aforementioned proposed method. In this case, each of DL and UL may operate with two HARQ processes.

FDD DL SF type 2=[DL control+DL data+DL control+DL data]
FDD UL SF type 2=[UL data+UL control+UL data]

In case of the FDD DL SF type 2, a (DL control) duration positioned at the center may not be configured depending on whether or not scheduling DCI is transmitted. Based on this, it may be able to indicate information on whether or not a DL data signal is mapped/received in the corresponding duration positioned at the center via a DL grant that schedules DL data transmission in a corresponding SF. Or, it may be able to indicate information on whether or not the (DL control) duration is configured via a specific broadcast signal (e.g., UE-common DCI). And, in case of the FDD UL SF type 2, a (UL control) duration positioned at the center may not be configured according to a configuration of the timing at which UCI is transmitted. Based on this, it may be able to indicate information on whether or not a UL data signal is mapped/transmitted in the corresponding duration positioned at the center via a UL grant that schedules UL data transmission in a corresponding SF. Or, it may be able to indicate information on whether or not the (UL control) duration is configured via a specific broadcast signal (e.g., UE-common DCI).

Meanwhile, all of the aforementioned 4 FDD SF types (i.e., DL SF types 1 and 2 and UL SF types 1 and 2) can be switched/changed according to an SF. Or, a specific partial type (e.g., one of the DL SF types 1 and 2 and one of the UL SF types 1 and 2) can be configured only. As a further different method, it may be able to additionally configure a DL control duration and a UL control duration (for transmitting a UL grant) at the center of the FDD DL SF type 1 and the FDD UL SF type 1, respectively. Or, it may be able to intentionally apply a fractional SF offset to a boundary between the DL SF and the UL SF of the FDD DL SF type 2 and the FDD UL SF type 2.

Meanwhile, it may consider a situation that a UL resource region within an SF is semi-statically or dynamically set to the TDD SF type and the FDD (UL) SF type using one of cases described in the following.
1) Case 1: a UL data duration is configured after a UL control duration
2) Case 2: a UL control duration is configured after a UL data duration In the foregoing description, (if a duration (e.g., DL control and/or GP) rather than a UL resource region within an SF is identically configured between the two cases) a starting symbol of a UL data channel can be differently configured between the two cases. For example, a starting symbol of a UL data channel of the case 2 can be set to a position (lower symbol index) prior to a starting symbol of a UL data channel of the case 1. Hence, a symbol position (index) at which a DMRS is transmitted of a UL data channel can also be differently configured/mapped between the two cases. In the case 1, if UL data transmission is performed immediately after UL control transmission, a power transient period may occur. The power transient period may generate DMRS signal distortion (performance degradation due to the DMRS signal distortion). A method of configuring a DMRS symbol is proposed in the following in consideration of the DMRS signal distortion.
1) Option 1: (when a starting symbol of a UL data channel is different between the two cases) a DMRS symbol is mapped/transmitted to a second symbol of the UL data channel (case 1) and a DMRS symbol is mapped/transmitted to a first symbol of the UL data channel (case 2). In this case, information on a symbol to which the DMRS is mapped/transmitted among the first symbol and the second symbol of the UL data channel can be indicated via UL grant DCI.
2) Option 2: (when a starting symbol of a UL data channel is different between the two cases) a DMRS symbol is mapped/transmitted to a second symbol of the UL data channel in both the case 1 and the case 2 (i.e., irrespective of a case). In this case, a separate indication indicating a DMRS symbol position (via UL grant DCI) may not exist.

Meanwhile, in the two cases, UL control transmission and UL data transmission can be simultaneously indicated/scheduled in the same SF for a single UE. In this case, the present invention proposes a UE operating (handling) scheme described in the following.

1) Alt 1: In case of the case 1, UCI, which is indicated to be transmitted on a UL control channel, is transmitted on a UL data channel in a manner of being piggybacked (i.e., UL control channel transmission is omitted). In case of the case 2, both a UL data channel and a UL control channel are transmitted via a single SF. In case of the case 1, the UCI can be mapped/transmitted to the first partial symbol (lower symbol index) of the UL data channel.

2) Alt 2: In both the case 1 and the case 2, UCI, which is indicated to be transmitted on a UL control channel, is transmitted on a UL data channel in a manner of being piggybacked (i.e., UL control channel transmission is omitted). In case of the case 1, the UCI is mapped to the first partial symbol (lower symbol index) of the UL data channel. In case of the case 2, the UCI is mapped to the last partial symbol (higher symbol index) of the UL data channel.

3) Alt 3: In both the case 1 and the case 2, a UL data channel and a UL control channel are transmitted via a single SF. In the case 1, if a UL data resource and a UL control resource are allocated to the same symbol, a) a UL data signal is not mapped/transmitted to the whole of the symbol (by performing puncturing) or b) a UL data signal is not mapped/transmitted to an overlapped frequency resource part only (by performing puncturing).

Meanwhile, in the case 1, a UL control channel is configured by a single symbol (or the small number of symbols) at a position (lower symbol index) prior to a UL data duration and can be considered as a short UL control channel in a form of being TDMed with a UL data channel. In addition, in order to support sufficient UL coverage, it may consider a long UL control channel which is configured by a plurality of (multiple) symbols in a form of being FDMed with a UL data channel. Meanwhile, if long UL control channel transmission is set/indicated to an SF described in the case 1, a long UL control channel can be configured in a form that a signal is not mapped/transmitted to a first partial symbol of a UL resource duration (by applying rate matching or puncturing). Hence, in consideration of a case that reconfiguration/change is made between the two cases, information on a symbol period (e.g., first/last symbol position/index) at which the long UL control channel is configured can be indicated via DCI (e.g., DL grant).

Meanwhile, information on a symbol to which a short UL control channel is transmitted among the first symbol of the UL resource duration (case 1) and the last symbol of the UL resource duration (case 2) can be indicated via DCI (e.g., DL grant). In addition, (in a TDD operation situation) as mentioned earlier in the case 1, if a short UL control channel is indicated to be transmitted to the first symbol of the UL resource duration, a UE may operate in a state that an SF to which the short UL control channel transmission is indicated as an SF not including a DL data duration (while including a UL data duration). In particular, the UE may be able to omit a DL signal (e.g., DL data and/or a specific DL RS (e.g., CSI measurement RS)) reception received via the SF. The UE may be able to omit a detection operation on (DL grant) DCI that schedules DL data transmission via the SF. Or, (although the DCI is detected), the UE may be able to ignore the DCI.

In addition, (in a TDD operation situation), if DCI (e.g., DL grant) scheduling/indicating transmission/reception of a DL data and/or a specific DL RS (e.g., CSI measurement RS) is detected in a specific SF via a DL control channel, the UE may be able to omit transmission of a UL data and/or a UL control channel and/or a specific UL RS (e.g., UL sounding RS) in an SF scheduled/indicated in advance. And, if DCI (e.g., UL grant) scheduling/indicating transmission of a UL data and/or a UL control channel and/or a specific UL RS is detected in a specific SF via a DL control channel, the UE may be able to omit reception of a DL data and/or a specific DL RS in an SF scheduled/indicated in advance.

Figure 25:
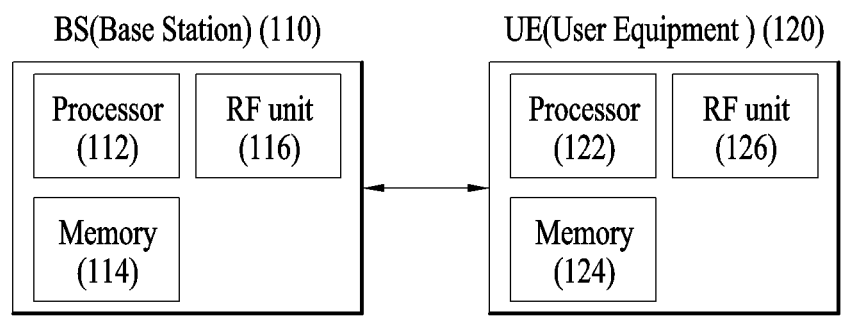
FIG. 25 illustrates a base station and user equipment applicable to an embodiment of the present invention.

FIG. 25 illustrates a BS and a UE of a wireless communication system, which are applicable to embodiments of the present invention.

Referring to FIG. 25, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

What is claimed is:

1. A method of transmitting an uplink signal, which is transmitted by a user equipment in a wireless communication system, the method comprising:
   receiving, from a base station (BS), first downlink (DL) scheduling information on an initial transmission of a DL data via a DL control duration of a time unit # n, the time unit # n is configured based on one of a first time unit type and a second time unit type,
   wherein the first time unit type is used for configuring a time unit to contain the DL control duration, a guard period (GP), an uplink (UL) control duration, and a first DL data duration in time order, and
   wherein the second time unit type is used for configuring a time unit to contain the DL control duration, a second DL data duration, the GP, the UL control duration, and a third DL data duration in time order;
   receiving, from the BS, the DL data via one of the first DL data duration and the second DL data duration of the time unit # n, based on a time unit type configured for the time unit # n,
   wherein the first time unit type is used when a specific time interval larger than a time interval between reception of the DL data via the first DL data duration and transmission of acknowledgement/negative acknowledgement (ACK/NACK) information is not required, and
   wherein the second time unit type is used when the specific time interval larger than the time interval between reception of the DL data via the first DL data duration and transmission of the ACK/NACK information is required;
   transmitting, to the BS, the ACK/NACK information via an UL control duration of a time unit # n+1 in response to the DL data; and
   receiving, from the BS, second DL scheduling information on retransmission of the DL data in a DL control duration of a time unit # n+2,
   wherein each of the time unit # n+1 and the time unit # n+2 is configured based on the first time unit type.

2. The method of claim 1, wherein each time unit contains a plurality of orthogonal frequency division multiple access (OFDMA) symbols.

3. The method of claim 1, wherein each time unit is a subframe or a half-frame.

4. The method of claim 1, wherein each time unit is a TTI (transmission time interval) or a half-TTI.

5. The method of claim 1, wherein the DL data is received via a physical downlink shared channel (PDSCH), and
   wherein the ACK/NACK information is transmitted via a physical uplink control channel (PUCCH).

6. A user equipment (UE) in a wireless communication system, the UE comprising:
   a radio frequency (RF) module; and
   at least one processor,
   wherein the at least one processor is configured to:
   control the RF module to receive, from a base station (BS), first downlink (DL) scheduling information on an initial transmission of a DL data via a DL control duration of a time unit # n, the time unit # n is configured based on one of a first time unit type and a second time unit type,
   wherein the first time unit type is used for configuring a time unit to contain the DL control duration, a guard period (GP), an uplink (UL) control duration, and a first DL data duration in time order, and
   wherein the second time unit type is used for configuring a time unit to contain the DL control duration, a second DL data duration, the GP, the UL control duration, and a third DL data duration in time order,
   control the RF module to receive, from the BS, the DL data via one of the first DL data duration and the second DL data duration of the time unit # n, based on a time unit type configured for the time unit # n,
   wherein the first time unit type is used when a specific time interval larger than a time interval between reception of the DL data via the first DL data duration and transmission of acknowledgement/negative acknowledgement (ACK/NACK) information is not required, and
   wherein the second time unit type is used when the specific time interval larger than the time interval between reception of the DL data via the first DL data duration and transmission of the ACK/NACK information is required,
   control the RF module to transmit, to the BS, the ACK/NACK information via an UL control duration of a time unit # n+1 in response to the DL data, and
   control the RF module to receive, from the BS, second DL scheduling information on retransmission of the DL data in a DL control duration of a time unit # n+2,
   wherein each of the time unit # n+1 and the time unit # n+2 is configured based on the first time unit type.

7. The UE of claim 6, wherein each time unit contains a plurality of orthogonal frequency division multiple access (OFDMA) symbols.

8. The UE of claim 6, wherein each time unit is a subframe or a half-frame.

9. The UE of claim 6, wherein each time unit is a TTI (transmission time interval) or a half-TTI.

10. The UE of claim 6, wherein the DL data is received via a physical downlink shared channel (PDSCH), and
    wherein the ACK/NACK information is transmitted via a physical uplink control channel (PUCCH).

* * * * *